(12) United States Patent
Wakimoto et al.

(10) Patent No.: US 6,571,052 B1
(45) Date of Patent: May 27, 2003

(54) MOVING PICTURE PLAYBACK APPARATUS

(75) Inventors: Koji Wakimoto, Tokyo (JP); Hiroto Nagahisa, Tokyo (JP); Satoshi Hisanaga, Tokyo (JP); Junshiro Kanda, Tokyo (JP); Satoshi Tanaka, Tokyo (JP); Akio Miyai, Tokyo (JP); Itsuji Nakamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/307,026

(22) Filed: May 7, 1999

Related U.S. Application Data

(62) Division of application No. 09/242,493, filed as application No. PCT/JP98/03064 on Jul. 8, 1998.

(51) Int. Cl.[7] .............................. G11B 27/00; H04N 5/93
(52) U.S. Cl. ............................................. 386/55; 386/52
(58) Field of Search ............................. 386/52, 55, 46, 386/1, 64, 68, 69, 4, 6; 360/13; 345/723; G11B 27/00; H04N 5/93

(56) References Cited

U.S. PATENT DOCUMENTS 5,122,886 A * 6/1992 Tanaka
5,126,851 A * 6/1992 Yoshimura et al.

FOREIGN PATENT DOCUMENTS

| EP | 1045316 A2 | * 10/2000 |
|---|---|---|
| JP | 9-284702 | 10/1987 |
| JP | 5-257989 | 10/1993 |
| JP | 6-217254 | 8/1994 |
| JP | 6-337898 | 12/1994 |
| JP | 8-294080 | 11/1996 |
| JP | 9-130736 | 5/1997 |
| JP | 9-205606 | 8/1997 |
| JP | 9-320201 | 12/1997 |

* cited by examiner

Primary Examiner—Robert Chevalier
(74) Attorney, Agent, or Firm—Birch, Stewart, Kolasch & Birch, LLP

(57) ABSTRACT

Based on the event detected by event detection unit 3, scene definition unit 4 defines the segment from the frame which is one screen of the moving picture corresponding to the event to the end of the next event as the scene The scene information of the defined scene is stored in scene information storage unit 5, and moving picture display unit 9 reads and displays the moving picture stored in moving picture storage unit 2 based on the scene information stored in scene information storage unit 5.

3 Claims, 35 Drawing Sheets

| NO. | FRAME NO. | EVENT TYPE | IMAGE DATA |
|---|---|---|---|
| 1a | 01:10:30:10 | RECORDING START | ● |
| 1b | 01:10:50:15 | RECORDING END | — |
| 2a | 01:10:50:16 | RECORDING START | ● |
| 2b | 01:11:25:05 | RECORDING END | — |

IMAGE DATA CORRESPONDING TO EVENT 2a

IMAGE DATA CORRESPONDING TO EVENT 1a

Fig.18
| NO. | FRAME NO. | EVENT TYPE | IMAGE DATA |
|---|---|---|---|
| 1a | 02:10:30:10 | RECORDING START | – |
| 1b | 02:10:38:20 | APPROACH TO BLDG. A | ● |
| 1c | 02:10:50:15 | RECORDING END | – |
| 2a | 02:40:50:16 | RECORDING START | – |
| 2b | 02:40:55:05 | APPROACH TO BLDG. B | ● |
| 2c | 02:41:25:05 | RECORDING END | – |
IMAGE DATA CORRESPONDING TO BUILDING B
IMAGE DATA CORRESPONDING TO BUILDING A
Fig.19
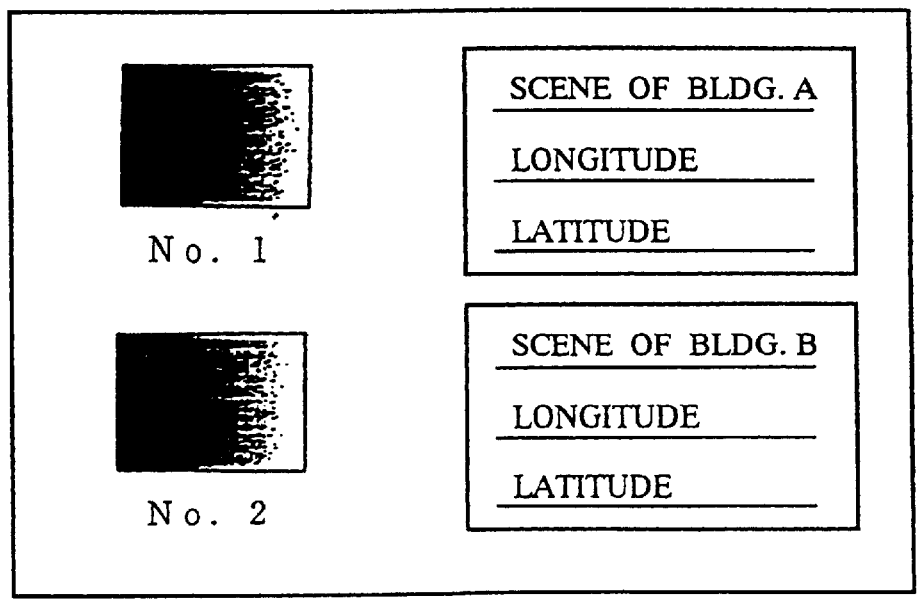

Fig.23

| FRAME NO. | PRIORITY |
|---|---|
| n1 | 1 |
| n2 | 1 |
| n21 | 2 |
| n211 | 3 |
| n22 | 2 |
| n3 | 1 |
| n4 | 1 |
| n41 | 2 |
| n42 | 2 |
| n421 | 3 |

Fig.40
CONVENTIONAL ART

```
[AIRPORT]
      STARTING · ENDING = 01:10:30:10-01:10:45:20
      PLAYBACK =
[SUPERHIGHWAY]
      STARTING · ENDING = 01:10:45:21-01:11:05:23
      PLAYBACK =
[RAILROAD]
      STARTING · ENDING = 01:18:00:05-01:19:05:10
      PLAYBACK =
```

Fig.41
CONVENTIONAL ART

```
[OUTPUT]
      00:00 _      : SUPERHIGHWAY
      03:00 _      : AIRPORT
      18:10 _      : RAILROAD
```

MOVING PICTURE PLAYBACK APPARATUS

This application is a divisional of co-pending application Ser. No. 09/242,493, filed on Feb. 19, 1999. Application Ser. No. 09/242,493 is the national phase of PCT International Application No. PCT/JP98/03064 filed on Jul. 8, 1998 under 35 U.S.C. §371. The entire contents of each of the above-identified applications are hereby incorporated by reference.

TECHNICAL FIELD

This invention relates to a moving picture edit processing for providing moving pictures by shooting, recording and editing them with a video camera, etc., and more particularly, this invention relates to a moving picture playback apparatus for playing back and displaying moving pictures, and a moving picture collection apparatus for collecting moving pictures.

BACKGROUND OF THE INVENTION

As a general and conventional moving picture playback apparatus for playing back moving pictures, there is a video tape recorder (VTR). With VTR, moving pictures are recorded on a video tape. When a user presses buttons such as "playback", "stop", "frame forward", "frame rewind" etc., on the VTR apparatus, which the video tape is set to, the tape is controlled according to an instruction, and the recorded moving pictures are displayed on a screen.

Furthermore, as the general and conventional moving picture collection apparatus for collecting moving pictures, there is a video camera recorder. The video camera recorder is a video camera combined with the VTR in one piece so as to make it easy to carry, and moving pictures shot with the video camera are to be recorded on the video tape by the VTR.

Here, let us consider a case when we shoot moving pictures with the video camera, and record and edit the moving pictures and produce a video title.

On the video tape, several scenes, for example, a "Scene at the Airport", a "Scene at the Port", a "Scene on a Superhighway", a "Scene on the Railroad", etc., are recorded. Suppose if we are to produce a video title regarding ground transportation, we have to select appropriate scenes such as the scenes at the airport, the scenes on the superhighway, the scenes on the railroad, etc., from the video tape, and then rearrange and concatenate them in a desired order. Moreover, in order to playback a certain segment of a scene, we have to set a playback segment in the scene, and we have to implement processing so as to specify the playback speed in order to playback the part in slow motion. For additional effects, such as overlapping the scene of the railroad on the scene of the superhighway, several scenes must be composited.

As an example of moving picture edit apparatus designed for such editing based on the moving pictures recorded on the video tape, there is a video edit system which combines the edit control apparatus with two or more VTRs. This system designates one VTR as an input VTR and the other VTRs as output VTRs, and edit operation such as processing or concatenating scenes are carried out by dubbing necessary scenes from the input VTR to output VTR in the order. Also, a composite edit operation is implemented by compositing signals from several input VTRs by the edit control unit and then sending out to the output VTRs.

Those are examples of the conventional and general moving picture playback apparatus and the moving picture edit apparatus using it, in recent years, a moving picture edit apparatus using a computer called a non-linear edit system is widely put to use (a typical product of the non-linear edit system is the MCXpress by Avid Technology Company of the United States). The non-linear edit system applies the technology which digitallizes moving picture data, compresses the data, and stores it in a computer memory, and then reads the data as necessary and playbacks after expanding the data. When this non-linear edit system is compared with the previously mentioned video edit system, the non-linear edit system has an advantage in editing without repeating dubbing from the video tape to the video tape, and thereby it's usage is gradually spreading.

The operation of the non-linear edit system, which is one example of the conventional moving picture edit apparatus, will be explained next.

FIG. 38 shows a general configuration of the conventional non-linear edit system.

The non-linear edit system is configured with a sequential access type moving picture storage unit 2 (the moving picture storage unit for VTR, etc., and called as the sequential access type moving picture storage unit hereinafter in order to distinguish it from the moving picture storage unit using a hard disk of a computer.) connected to a computer 50. In a typical configuration of the non-linear edit system, computer 50 and sequential access type moving picture storage unit 2 are connected with a signal cable and control cable. The signal cable inputs signals of moving pictures or sound played back by sequential access type moving picture storage unit 2 into computer 50. And the control cable is used for controlling playback, stop, frame forward, or frame rewind from computer 50 to sequential access type moving picture storage unit 2, and for transmitting the frame number of the frame currently displayed from sequential access type moving picture storage unit 2 to computer 50.

Moving pictures shot with the video camera is recorded on a medium such as the video tape, and then stored in the sequential access type moving picture storage unit 2.

The user performs editing by inputting a command from a command input unit 8 using a keyboard or a mouse of the computer.

An example of user interface for editing is illustrated in FIG. 39.

In the figure, there are shown a scene menu window 111, a displayed scene icon 112, a moving picture playback window 113 for playing back one of the scenes, playback control button 114 for controlling moving picture playback by the moving picture playback window 113, a stop button 115, a playback button 116, a frame rewind button 117, a frame forward button 118, a scene definition window 119 for specifying a starting frame and an ending frame for each scene, a new scene display button 120 for displaying new scenes, and a moving picture edit window 121 for concatenating and compositing each scene and defining a new scene.

The editing is performed in the following procedure using the user interface aforementioned.

(1) Defining a Scene

The user firstly defines a scene of related segment in the moving pictures such as the scene of the airport, the scene of the superhighway, and so forth, by a scene definition unit 20. The information of the defined scene is stored in scene information storage unit 5. The scene information contains a specified starting frame number and ending frame number for each scene.

FIG. 40 indicates one example of the scene information.

The explanation of the frame number is now given. A moving picture, for instance, consists of 30 images per second. Each image is referred to as the frame. Moving pictures are recorded on a medium such as the video tape by sequential access type moving picture storage unit 2, and the number specifying each frame on the medium is called the frame number.

Business VTRs use the number called the time code for the purpose of specifying frames. The time code is expressed with an 8-digit number such as 01:10:35:08, which represents the 8th frame of one hour, ten minute, and 35 seconds.

Defining a scene is, for example, carried out as below.

First of all, in FIG. 39, a new scene display button 120 is clicked with the mouse. Then, a new scene having no defined title, starting frame and ending frame is displayed on moving picture playback window 113. The scene is then defined by inputting the title, starting frame number, and ending frame number at the keyboard on scene definition window 119.

For defining a scene in the previously mentioned method, the user has to know the starting frame number and the ending frame number of the scene to be defined beforehand. Business VTRs are provided with a function to display the time code of the frame currently displayed on the monitor screen, which enables the user to know the starting frame number and the ending frame number by reading the displayed time code from the screen by positioning the desired frame using such buttons as the forward button, rewind button, frame forward, frame rewind, etc., of the VTR.

(2) Reading a Moving Picture

Then, the defined scene is digitally compressed by a moving picture digital compression unit 6, and stored in direct access type moving picture storage unit 7 of computer 50 (a hard disk memory, and is referred to as the direct access type moving picture storage unit hereinafter to distinguish it from sequential access type moving picture storage unit 2 of the VTR, etc.).

With regard to the format of digital compression of moving pictures, there are various types of formats such as MPEG, Motion-JPEG, Cinepak, and so forth, but because the computation amount becomes huge whichever system is used for digital compression, it is common to execute by inserting an extension board special for digital compression into the computer so as to shorten the processing time.

The processing for digital compression of moving pictures becomes as explained below.

The system first performs processing of digital compression for each scene defined by scene definition unit 20. Because each scene has its starting frame and ending frame described, computer 50 controls sequential access type moving picture storage unit 2 to position the starting frame of a target scene.

Then, the playback of sequential access type moving picture storage unit 2 is started, and at the same time, an instruction is sent to moving picture digital compression unit 6, and the processing for digital compression starts. Moving picture digital compression unit 6 inputs signals output from sequential access type moving picture storage unit 2, and converts each frame into digital data, and performs data compression. The obtained digital compression data is stored in direct access type moving picture storage unit 7.

(3) Displaying a Scene

In FIG. 39, scene menu window 111, for each scene stored in a scene information storage unit 5, moving picture display unit 9 creates a scene icon 112 and displays. For scene icon 112, any image which allows the user to easily grasp the content of the scene can be used, but it is typically created by contracting the first frame of each scene. Furthermore, when one of the scenes is selected by the click of the mouse, moving picture display unit 9 displays the selected scene on a moving picture playback window 113. The display of moving picture playback window 113 can be controlled by playback control button 114, and the playback of the moving pictures is started when playback button 116 is clicked, and the playback of the moving pictures is stopped when stop button 115 is clicked. Or, when frame rewind button 117 or frame forward button 118 is clicked, a frame immediately before or after the current frame is displayed and stopped.

In such a case, moving picture display unit 9 reads the moving picture data digitally compressed and stored in direct access type moving picture storage unit 7, expands the data on the spot, and performs processing of displaying the obtained data on the screen.

The edit operation explained below is proceeded by displaying and checking the contents of each scene as thus far explained.

(4) Executing an Edit Operation

The edit operation involves processing, concatenating, and compositing scenes. As an example of a scene processing, there are a setting of a playback area or partial change in playback speed. This operation is performed by specifying the playback area by the frame number on scene definition window 119. Also, a scene concatenation or scene composition is performed by lining each scene icon 112 on moving picture edit window 121. On moving picture edit window 121, the horizontal axis corresponds to the time axis, and when scene icon 112 is lined within this window in order, each scene is concatenated from left to right in order and the new scene is defined. Moreover, there are two tracks A and B on moving picture edit window 121, and when scenes are lined at the same time belt on both tracks, two scenes are composited.

The defined scene is stored in direct access type moving picture storage unit 7, and the scene information is stored in scene information storage unit 5. An example of describing the newly defined scene is shown in FIG. 41.

(5) Creating a Moving Picture

The new scene is defined by the above mentioned edit operation. Based on the description of the scene, moving picture creation unit 11 reads the moving picture data of each scene stored in direct access type moving picture storage unit 7, and processes, concatenates, composites, and performs other operations to create a new moving picture data. The created moving picture data is again stored in direct access type moving picture storage unit 7. When the moving picture data is read and copied onto a medium such as a CD ROM, the medium can be distributed and data can be played back on other computers. It is also possible that the moving picture data is played back and the signal can be transmitted to sequential access type moving picture storage unit 2, and then recorded onto the medium such as the video tape, then the medium can be distributed and the data can be played back on the VTR, and so on.

The conventional moving picture playback apparatus and the moving picture collection apparatus are configured as above mentioned. Let us suppose now that one hundred scenes are shot with the video camera, and each scene is about 30 seconds, and then edit those moving pictures. In order to perform editing, scenes in the moving pictures must first be defined. In order to define the scenes, a work of specifying the starting frame and ending frame for each of the 100 scenes must be performed. For defining one scene, if it takes about 30 seconds to perform the operation for finding out the starting fame and ending frame by implementing the forward, rewind, frame forward, frame rewind, etc. of the VTR, then, it amounts to about 50 minutes to define 100 scenes.

Also, for the processing of compressing data by digitallizing the moving pictures, because it generally takes about the same time period as the continuation time period of the moving pictures, it takes about 50 minutes for processing digitally compressing 100 scenes and storing in the direct access type moving picture storage unit.

In this way, the conventional moving picture playback apparatus and the moving picture collection apparatus pose a problem of taking substantial time period until the edit operation is enabled after the shooting of moving pictures has ended, in order to define the scenes or to read the moving pictures.

Or, in defining the scene, the work of specifying the starting frame and ending frame of the scene exactly is a troublesome task which cannot be done without careful attention.

Furthermore, the moving picture data must be digitally compressed and stored in the computer memory, if, for instance, data compression is performed in the MPEG1 compression format, the digitally compressed moving picture data becomes about 1.5 megabit data amount per second. In order to digitallize all 100 scenes and store in the computer memory in the MPEG1 format, a storage capacity of at least 500 mega bytes is required.

Also, in order to perform digital compression of moving pictures, an expansion board special for digital compression of moving pictures must be inserted into the computer.

In this way, because the conventional moving picture edit apparatus needs a large capacity storage or a compression board special for moving pictures, it poses problems that it becomes a large-size apparatus not suited to carry around or for use in a limited space such as a home or office.

This invention is designed to solve above-mentioned problems, and it aims at obtaining a moving picture playback apparatus or a moving picture collection apparatus which can define scenes or read moving pictures in a short time, and confirm the contents of the collected moving pictures quickly.

SUMMARY OF THE INVENTION

The first aspect of the invention is a moving picture playback apparatus which comprises a moving picture storage unit for storing a moving picture shot by a shooting device;

an event detection unit for detecting an event of one of a change in a shooting subject, the change in the shooting device, and an operation of a shooter during shooting, while shooting with the shooting device;

a scene definition unit for defining a segment, as a scene, separated by a frame which is a screen of the moving picture corresponding to an event and by a frame corresponding to a next event based on the event detected by the event detection unit;

a scene information storage unit for storing scene information of the scene defined by the scene definition unit;

a command input unit for inputting an instruction from a user; and a moving picture display unit for reading and displaying the moving picture stored in the moving picture storage unit based on the instruction input by the command input unit and the scene information stored in the scene information storage unit.

The second aspect of the invention is the moving picture playback apparatus, wherein the event detection unit may detect, as the event, one of the change in a position of the shooting device, direction of the shooting device, and a lens condition during shooting.

The third aspect of the invention is the moving picture playback apparatus, wherein the event detection unit may detect, as the event, one of an operation of a scene start and an operation of a scene end of the shooter during shooting.

The fourth aspect of the invention is the moving picture playback apparatus which may further comprise:

an edit unit for reading the moving picture stored in the moving picture storage unit based on the instruction input by the command input unit and the scene information stored in the scene information storage unit, and processing, compositing, and concatenating the moving pictures to edit a new scene, and storing scene information of the new scene in the scene information storage unit; and a moving picture creation unit for creating a moving picture for the new scene based on the scene information of the new scene stored in the scene information storage unit.

The fifth aspect of the invention is a moving picture playback apparatus which may comprise:

a moving picture storage unit for storing a plurality of moving picture;

a scene definition unit for defining a segment in the moving picture stored in the moving picture storage unit as a scene;

a scene information storage unit for storing scene information of the scene defined by the scene definition unit;

a typical frame storage unit for storing a typical frame which represents the scene defined by the scene definition unit;

a typical frame determination unit for selecting the typical frame, which represents the scene, in the scene defined by the scene definition unit, reading the selected typical frame from the moving picture storage unit, and storing in the typical frame storage unit;

a command input unit for inputting an instruction from a user; and a moving picture display unit for displaying the typical frame stored in the typical frame storage unit based on the instruction input by the command input unit.

The sixth aspect of the invention is the moving picture playback apparatus, wherein the moving picture display unit may display the typical frame from the typical frame storage unit if the frame to be displayed is the typical frame, and display the closest typical frame before the typical frame to be displayed from the typical frame storage unit if the frame to be displayed is not the typical frame.

The seventh aspect of the invention is the moving picture playback apparatus, wherein the moving picture display unit may display the frame to be displayed from the moving picture storage unit if the frame to be displayed is not the typical frame when the instruction input from the command input unit may be one of a stop, frame forward, and frame rewind.

The eighth aspect of the invention is the moving picture playback apparatus, wherein the moving picture display unit may display the typical frame from the typical frame storage unit if the frame to be displayed may be the typical frame when the instruction input from the command input unit may be one of the stop, frame forward, and frame rewind.

The ninth aspect of the invention is the moving picture playback apparatus may further comprise an event detection unit for detecting an event of one of a change in a shooting subject, the change in a shooting device, and an operation by a shooter during shooting with the shooting device, and wherein the typical frame determination unit may select a frame corresponding to the event detected by the event detection unit as the typical frame of the scene including the frame.

The tenth aspect of the invention is the moving picture playback apparatus may further comprise an edit unit for reading the moving picture stored in the moving picture storage unit, process, composite, and concatenate the moving pictures based on the instruction input by the command input unit and the typical frame stored in the typical frame storage unit, and edit a new scene, and store scene information of the new scene in the scene information storage unit, and a moving picture creation unit for creating a moving picture for the new scene based on the scene information of the new scene stored in the scene information storage unit.

The eleventh aspect of the invention is a moving picture collection apparatus may comprise:

an event detection unit for detecting an event of one of a change in a shooting subject, the change in a shooting device, and an operation of a user during shooting with a shooting device; and a frame number obtainment unit for obtaining a frame number of a frame which may be one screen of the moving picture corresponding to the event; and an event information storage unit for storing event information which may correspond to the event detected by the event detection unit and the frame number.

The twelfth aspect of the invention is the moving picture collection apparatus, wherein the event detection unit may detect, as the event, one of the change in a position of the shooting device, the change in a direction of the shooting device, the change in a lens condition, an operation of a recording start of a user and an operation of a recording end of the user.

The thirteenth aspect of the invention is the moving picture collection apparatus, wherein the event information storage unit may obtain an image data of a frame in the moving picture corresponding to the event, and may obtain the change in the position of the shooting device corresponding to the event, direction of the shooting device and the change of the lens condition corresponding to the event, and store as the event information.

The fourteenth aspect of the invention is the moving picture collection apparatus, wherein the event information unit may input and store an explanation sentence added by the user corresponding to the event stored in the event information storage unit.

The fifteenth aspect of the invention is the moving picture collection apparatus may further comprise an explanation sentence input unit for obtaining the image data of the frame in the moving picture corresponding to the event stored in the event information storage unit, displaying the image data of the frame on a display screen, and having the user input an explanation sentence of the event corresponding to the image data of the frame displayed on the display screen, and wherein the event information storage unit may store the explanation sentence from the explanation sentence input unit.

The sixteenth aspect of the invention is the moving picture collection apparatus, wherein the event detection unit may detect, as the event, an approach of the shooting device toward a preset shooting subject.

The seventeenth aspect of the invention is the moving picture collection apparatus, wherein the event detection unit may detect, as the event, one of an entering, and a coming out of the shooting device to/of a preset shooting area.

The eighteenth aspect of the invention is the moving picture collection apparatus may further comprise a shooting device control unit for sending an order to the shooting device to change its direction toward the shooting subject corresponding to the event of approaching of the shooting device toward the preset shooting subject corresponding to the event detected by the event detection unit.

The nineteenth aspect of the invention is the moving picture collection apparatus, wherein the shooting device control unit may send an order of one of a recording start and a recording end corresponding to the event of one of entering and coming out of the shooting device to/of the preset shooting area.

The twentieth aspect of the invention is the moving picture collection apparatus may further comprise an event information display unit for displaying the event information, a command input unit for inputting an instruction from a user based on the displayed event information, and a moving picture playback instruction unit for selecting the event based on the instruction input by the command input unit, and specifying the frame number of the frame in the moving picture corresponding to the selected event, and instructing a playback of the moving picture from the frame specified by the frame number.

The twenty-first aspect of the invention is a moving picture collection apparatus may comprise:

a moving picture input unit for inputting a moving picture shot by a shooting device;

an event detection unit for detecting an event one of a change in a shooting subject, the change of the shooting device, and an operation by a user during shooting with the shooting device;

an event information storage unit for expressing information of the event detected by the event detection unit with image and sound, and compositing the event information with the moving picture input by the moving picture input unit and storing it.

The twenty-second aspect of a moving picture playback apparatus may comprise a priority set unit for setting a priority for a frame of a moving picture composed of a plurality of continuous frames;

a priority obtainment unit for obtaining the priority set for the frame of the moving picture by the priority set unit;

a playback speed set unit for setting a moving picture playback speed at which the moving picture is played back;

a frame selection unit for selecting a frame of the moving picture based on the playback speed set by the playback speed set unit and the priority set for the frame of the moving picture obtained by the priority obtainment unit;

a frame obtainment unit for obtaining an image of the frame selected by the frame selection unit; and a moving picture display unit for displaying the image of the frame obtained by the frame obtainment unit.

The twenty-third aspect of the invention is a moving picture playback apparatus may comprise:

a priority set unit for setting a priority for a frame of a moving picture composed of a plurality of continuous frames;

a frame obtainment unit for obtaining an image of the frame of the moving picture;

a priority obtainment unit for obtaining the priority set for the frame of the moving picture by the priority set unit;

a typical image obtainment unit for obtaining the image of the frame set a high priority by the priority set unit as a typical image;

a typical image storage unit for storing the typical image obtained by the typical image obtainment unit;

a playback speed set unit for setting a moving picture playback speed at which the moving picture is to be played back;

a frame selection unit for selecting the frame of the moving picture based on the playback speed set by the playback speed set unit and the priority set for the moving picture frame obtained by the priority obtainment unit; and a moving picture display unit for displaying the image of the frame selected by the frame selection unit from one of the frame obtainment unit and the typical image storage unit.

The twenty-fourth aspect of the invention is the moving picture playback apparatus, wherein the moving picture display unit may read and display the image of the frame from the typical image storage unit when the playback speed set by the playback speed set unit may exceed a normal playback speed, and read and display the image of the frame from the frame obtainment unit when the playback speed may be below the normal playback speed.

The twenty-fifth aspect of the invention is the moving picture playback apparatus, wherein the typical image storage unit may change the frame to be stored as the typical image according to a timing relation between the frame of the typical image stored by the typical image storage unit and the frame currently displayed by the moving picture display unit.

BRIEF DESCRIPTION OF THE DRAWINGS

FIG. 18 is a diagram explaining an event information stored in an event information storage unit of Embodiment 7.

FIG. 19 is a diagram explaining an index displayed on a display unit of Embodiment 7.

FIG. 23 is a diagram showing an example of setting priority of Embodiment 9.

FIG. 40 explains a scene information of the conventional moving picture playback apparatus.

FIG. 41 explains the scene information of the conventional moving picture apparatus.

DETAILED DESCRIPTION OF THE INVENTION

The embodiments of this invention will be explained below. The moving picture playback apparatus of all embodiments are provided with an edit function for editing moving pictures anew by processing, compositing, or concatenating the moving pictures.

Although the explanation is given with the video camera as the apparatus for shooting moving pictures for the following embodiments, there are image taking apparatuses such as a digital camera, digital video camera, other than the video camera as the apparatus for shooting moving pictures.

Embodiment 1

Figure 1:
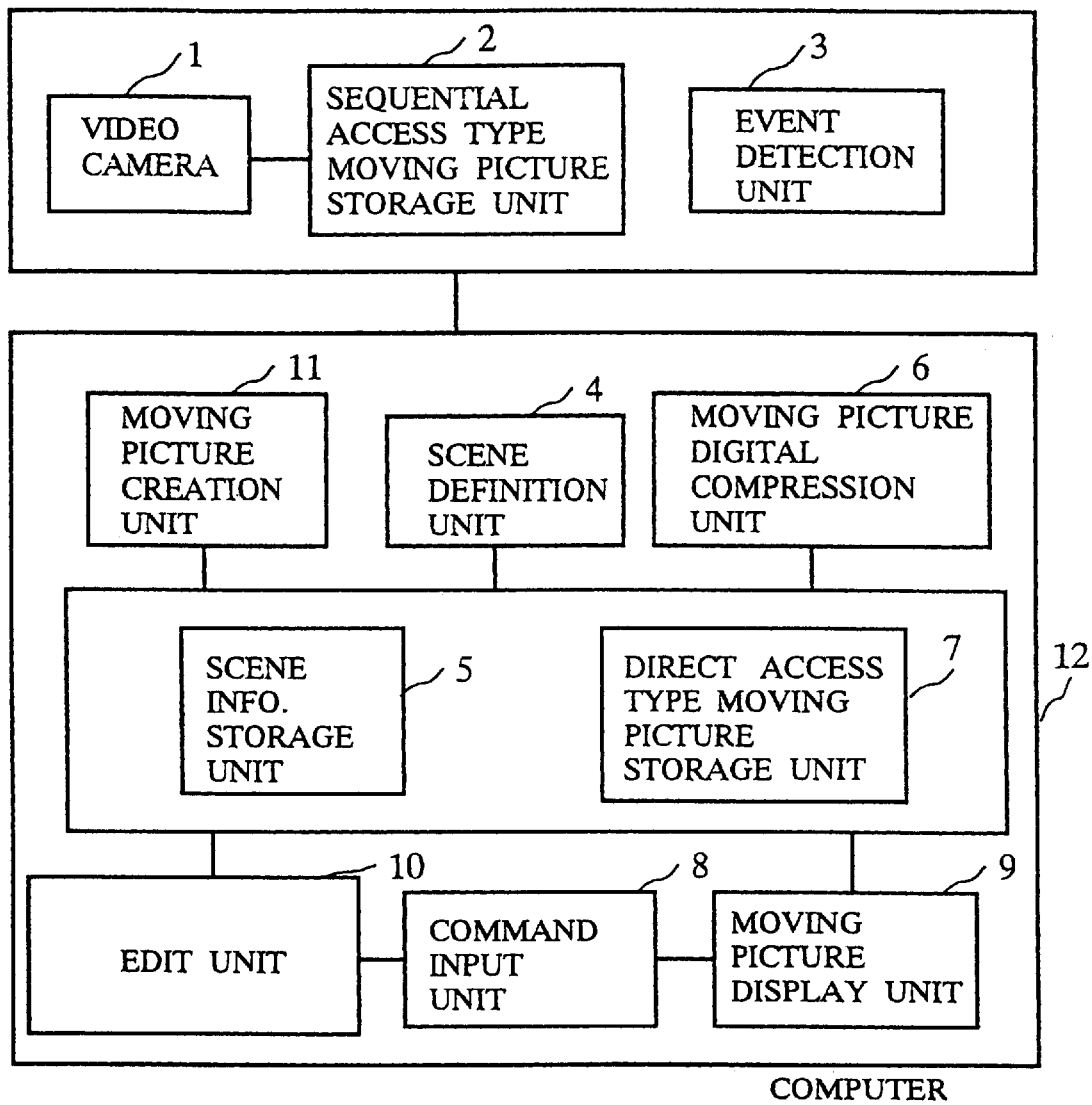
FIG. 1 shows a configuration of a moving picture playback apparatus of Embodiment 1.

FIG. 1 shows the configuration of a moving picture playback apparatus for Embodiment 1.

In the figure, a video camera 1 for shooting a shooting subject, a sequential access type moving picture storage unit 2 for storing moving pictures shot by video camera 1, an event detection unit 3 for detecting an event during shooting, a scene definition unit 4 for defining a scene from a frame which is one screen of the moving pictures corresponding to the event detected by event detection unit 3 to the frame corresponding to the next event as the end as one segment, a scene information storage unit 5 for storing the scene information consisting of numbers of the starting and ending frames of the scene defined by scene definition unit 4, a moving picture digital compression unit 6 for compressing the scene defined by scene definition unit 4, a direct access type moving picture storage unit 7 for storing the compressed scene, a command input unit 8 for inputting user instructions, a moving picture display unit 9 for displaying a scene and frame to be displayed, an edit operation execution unit 10 for editing a new scene by processing, compositing, or concatenating scenes, a moving picture creation unit 11 for creating moving pictures based on the information of the new scene, and a computer 12 are illustrated.

As stated above, the moving picture playback apparatus of this embodiment is configured by video camera 1 attached with sequential access type moving picture storage unit 2 and event detection unit 3, and connected computer 12.

The operation of this embodiment is explained below.

(0) Shooting

The user shoots shooting subjects using video camera 1. The video camera 1 is provided with a unit which transmits data by communicating with computer 12. As the unit which transmits data between video camera 1 and computer 12, there is such a communication standard as IEEE1394, but naturally it is not limited. Although video camera 1 and computer 12 are normally connected with a cable, in order for the cable between video camera 1 and computer 12 not to become an obstacle, a configuration of data transmission by radio is more convenient. In order to make it easy to carry the apparatus, a notebook type or schedule book type computer 12 is desirable.

This embodiment is a case when configured by video camera 1 equipped with event detection unit 3 and computer connected to this. However, when event detection unit 3 is equipped with the side of computer 12, computer 12 performs transmission between video camera 1, and it is possible to obtain the frame and the frame number being shot by video camera 1 or being played back at an arbitrary point.

Event detection unit 3 detects the change of shooting subjects, change of video camera 1, or events in the operation of the person taking pictures, during shooting. Here, as an example of the change of shooting subjects, an appearance of the shooting target, the deletion of the shooting target, the movement of the shooting target, the stop of the shooting target, and the deformation of the shooting target, and so on may be considered. And as examples of the change of video camera 1, there are the movement of the position of the camera, the change of the direction of the camera, and zoom in or zoom out of the camera, and so on. As an example of the operation of the person who shoots pictures, the starting or interrupting of shooting, and so on may be considered.

Normally, scenes shot with video camera 1 remarkably change before or after the frame to which the event described previously occurs. Therefore, if scenes are defined by detecting the occurrence of these events, and by making the frame corresponding to them as an end, the user needs not specifying the starting frame and ending frame of each scene one by one.

In order to detect these events, for instance, the following configuration is advisable.

(0-1) Detecting the Change of Shooting Subject

In order to detect the change of shooting subject, the pictures being shot by video camera 1 are monitored, and the difference between the two adjacent frames can be detected when it exceeds a certain amount. For this purpose, it is possible to configure the moving pictures stored in sequential access type moving picture storage unit 2 are checked so that an occurrence of change is detected, or with a special apparatus using a micon incorporated in video camera 1, it is possible to read a frame being shot into the memory one by one so that an occurrence of change is detected. This embodiment is a case which is configured by video camera 1 attached with event detection unit 3 and computer 12 connected to this. However, when event detection unit 3 is attached to the side of computer 12, it is possible to configure that frames being shot are read into the memory of computer 12 one by one and checked so that an occurrence of change is detected.

(0-2) Detecting the Change of Video Camera

At an arbitrary point, the state of video camera 1 can be described by the position of the camera, the direction of the camera, and the focal distance of the lens. By monitoring these parameters during shooting, changes can be detected.

The position of the camera and the direction of the camera, for instance, can be calculated by attaching a magnetic sensor to video camera 1. Because the focal distance of the lens changes as operation is performed for zoom in and zoom out, the state of the zoom in or zoom out at the point can be detected by a mechanical unit.

This embodiment is a case which is configured by video camera 1 attached with event detection unit 3 and computer 12 connected to this. However, when event detection unit 3 is attached with the side of computer 12, obtained each parameter previously mentioned is read into computer 12 and processed, and the time when there is a significant change in the parameters can be detected.

(0-3) Detecting the Operation of the Person Taking Pictures

Buttons for starting or interrupting the shooting are usually provided with video camera 1, and the person who shoots can start or interrupt the shooting by pressing these buttons. Other than the events which are previously mentioned starting or interrupting shooting, it is possible to define the starting or ending zoom as the events. Furthermore, in order to separate the scene obtained by one shooting operation from the starting of the shooting to the interrupting of the shooting into a plurality of scenes, a dedicated button is provided with video camera 1, and the person who shoots can separate the scene by pressing the button as the person desires to separate the scene during shooting.

In order to detect these events, it is possible to configure to detect when the button is pressed on video camera 1 and the event of pressing the button is transmitted to computer 12.

(1) Defining the Scene

Scene definition unit 4 performs definition of scene based on the information of the event detected by event detection unit 3.

Figure 2:
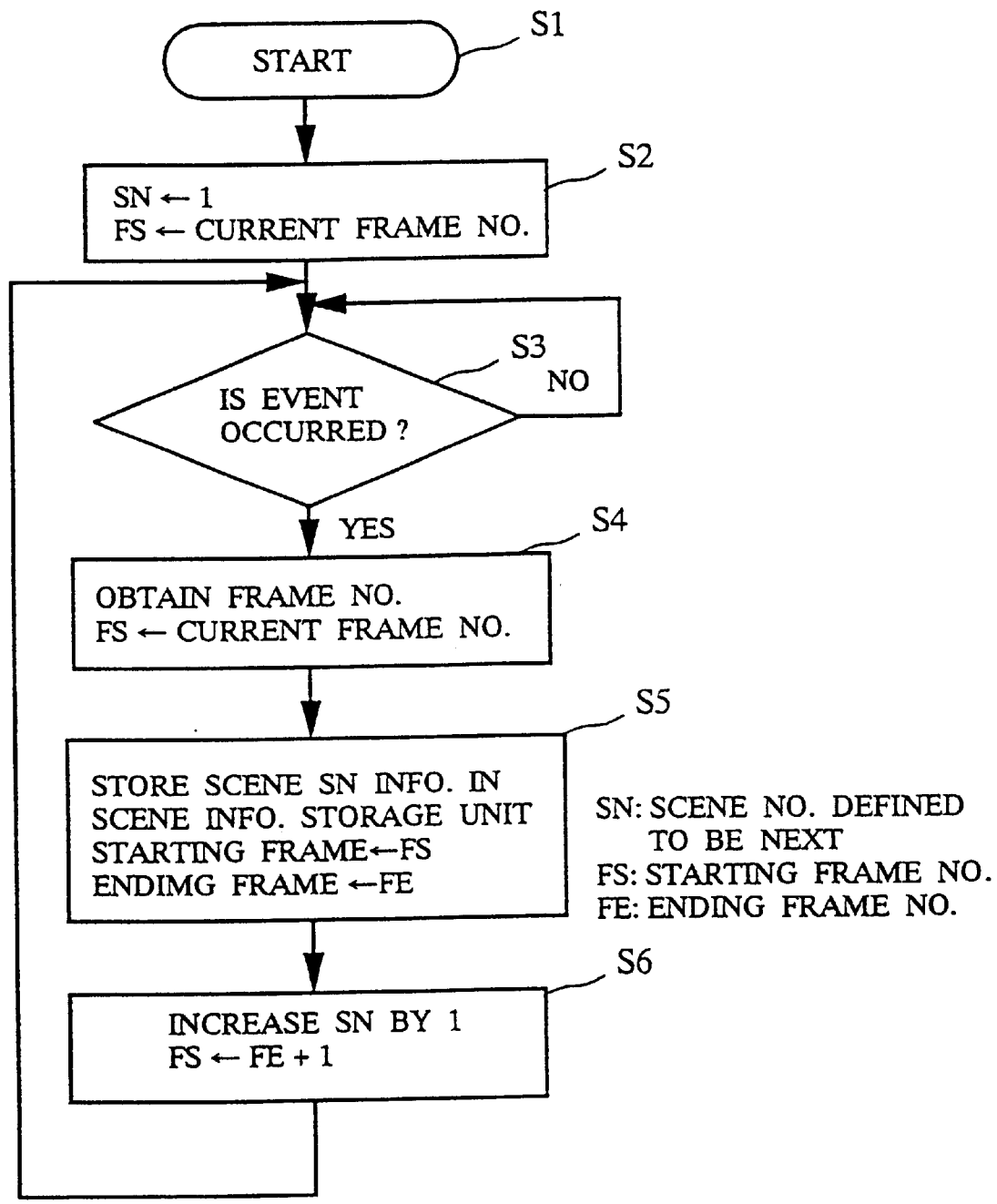
FIG. 2 is a flowchart showing the operation of a scene definition unit of Embodiment 1.

FIG. 2 is a flowchart showing the processing flow of scene definition unit 4.

The processing procedure of the scene definition unit is explained.

First, the processing starts at step S1, and at step S2, "1" is substituted as the scene number SN that is to be defined next and the current frame number is substituted as the starting frame number FS. Whether or not an event has occurred is checked at step S3, and the moving pictures are forwarded until an event is confirmed. When the event is confirmed, the frame number corresponding to the event is read at step S4, and the frame number (current frame number) is substituted as the ending frame number FE.

At step S5, the frame of the starting frame number FS is assumed to be the starting frame, and the frame of the ending frame number FE is assumed to be the ending frame and stored in scene information storage unit 5. At step 6, 1 is added to the scene number SN, which is to be defined next, and the prior ending frame number FD is added by 1 and substituted as the starting frame number FS, and returns to the step S3 again and waits for an occurrence of a new event.

In this way, scene definition unit 4 defines each scene with the frame corresponding to the event as the end, and the scene information, e.g., the starting frame number and the ending frame number are written into scene information storage unit 5.

(2) Reading the Moving Pictures

This is basically the same as the conventional non-linear editing system operation.

(3) Displaying the Scene

This is basically the same as the conventional non-linear editing system operation.

(4) Executing the Edit Operation

This is basically the same as the conventional non-linear editing system operation.

(5) Creating the Moving Pictures

This is basically the same as the conventional non-linear editing system operation.

According to the present embodiment, as explained above, the user need not do cumbersome work which requires an attentive power to instruct the starting frame and the ending frame of each scene manually, and also can save time.

Embodiment 2

Figure 3:
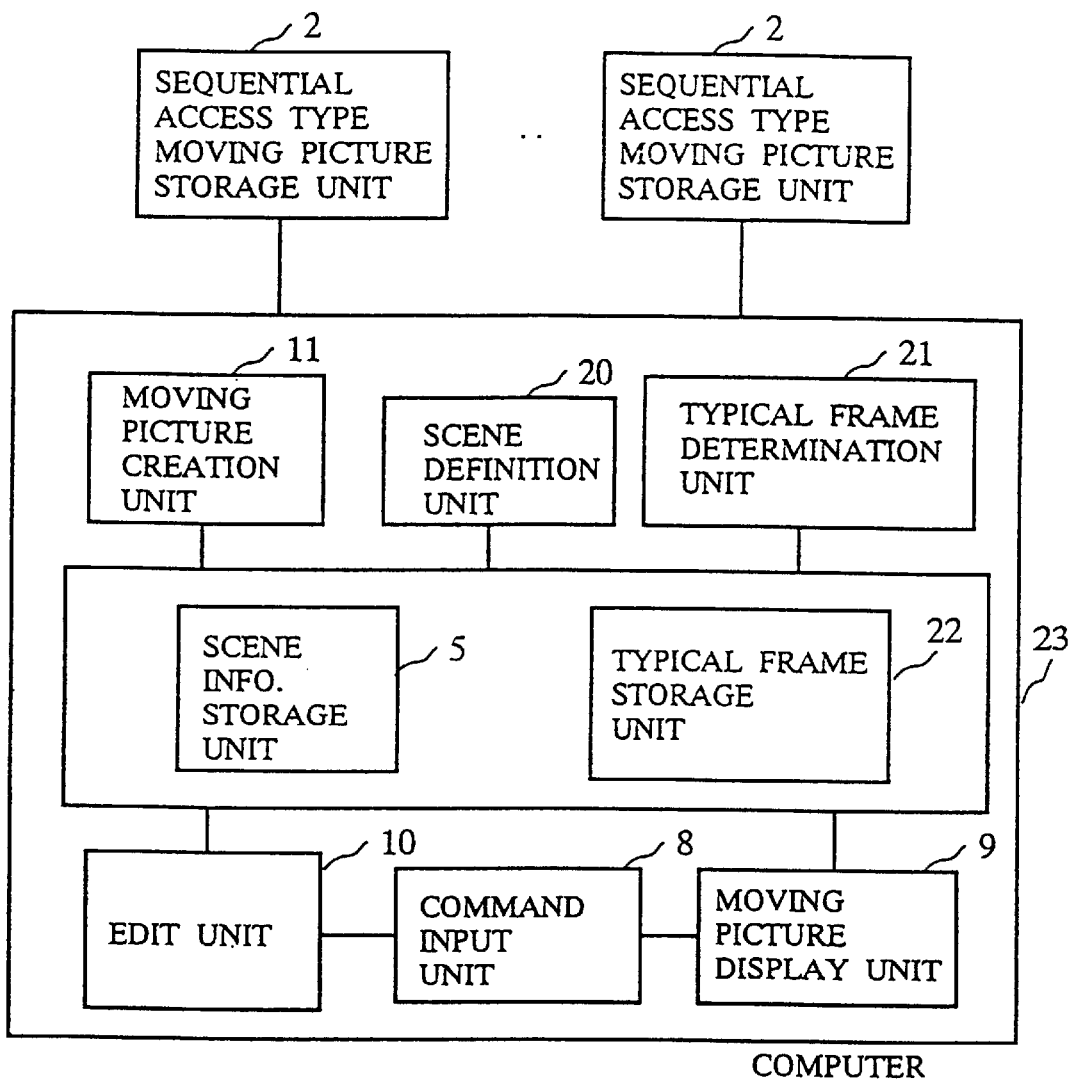
FIG. 3 shows a configuration of a moving picture playback apparatus of Embodiment 2.

FIG. 3 shows a configuration of a moving picture playback apparatus of Embodiment 2.

This embodiment represents a case in which moving pictures are played back or edited without being digitally compressed and read into a computer, and moving pictures which are the edited result, are obtained, for instance, by dubbing the moving pictures from one VTR to another VTR. Therefore, this configuration requires two or more sequential access type moving picture storage units.

(1) Defining the Scene

The scene definition method is basically the same as the conventional non-linear edit system operation.

(2) Reading the Moving Pictures

A typical frame determination unit 21 selects one or more typical frames for each scene defined by scene definition unit 20. There are several methods for selecting typical frames as follows:

The most typical method is to select the top frame of each scene as the typical frame.

Or, it is possible to select typical frames at a certain interval, such as a first frame, 31st frame, 61st frame, and so on for each scene.

Or, it is also possible to select frames having a remarkable change by looking into the moving pictures of each scene as the typical frame.

A typical frame storage unit 22 stores the moving picture data of the frame determined by typical frame determination unit 21. At this time, moving picture data may be stored in different files for each frame, or typical frames included in the scene may be stored in one file collectively. Also, frames may be stored in a bitmap format without being compressed, or compressed in the JPEG format and so forth.

The frame number and the moving picture data of the frame are stored as a set in typical frame storage unit 22. The obtainment of the picture data to be stored is performed as explained below. When the definition of a scene is finished by scene definition unit 20, typical frame determination unit 21 performs determination of a typical frame for each scene and obtainment of picture data of the typical frame. In order to obtain the picture data, typical frame determination unit 21 positions sequential access type moving picture storage unit 2 to each typical frame, and the frame is read there and stored in typical frame storage unit 22.

(2) Displaying the Scene

A moving picture display unit 9 plays back the moving pictures of each scene according to the instruction from the user and displays them on the screen. Sequential access type moving picture storage unit 2 can play back stored moving pictures sequentially from the start, but if it attempts to play back the scene defined by scene definition unit 20, the scene cannot be immediately played back because the video tape, etc., must be forwarded to the position of the scene. Or, when a new scene is defined by concatenating two scenes, if an attempt is made to playback the concatenated scene, after one scene is played back, the playback is disconnected until the video tape, etc., is forwarded to the next scene.

Therefore, in this embodiment, the typical frame of each scene is read from typical frame storage unit 22 and displayed. The picture data of the selected typical frames is stored in typical frame storage unit 22, and moving picture display unit 9 reads the picture data of the stored typical frame in accordance with the timing of the frame number and displays. When playback is performed in this way, it is possible to confirm the rough content although a smooth playback is not.

When the apparatus is configured in this way, although it is sufficient to playback and confirm the content roughly, it is not suited to fine editing work because a frame cannot be displayed unless the frame is a typical frame when a specific frame is to be confirmed. Therefore, it is possible to configure the apparatus in such a way that when the frame forward, frame rewind, stop, and other display command are input, if the frame to be displayed is not the typical frame, sequential access type moving picture storage unit 2 positions the medium to the frame so as to read the picture data and display.

Figure 4:
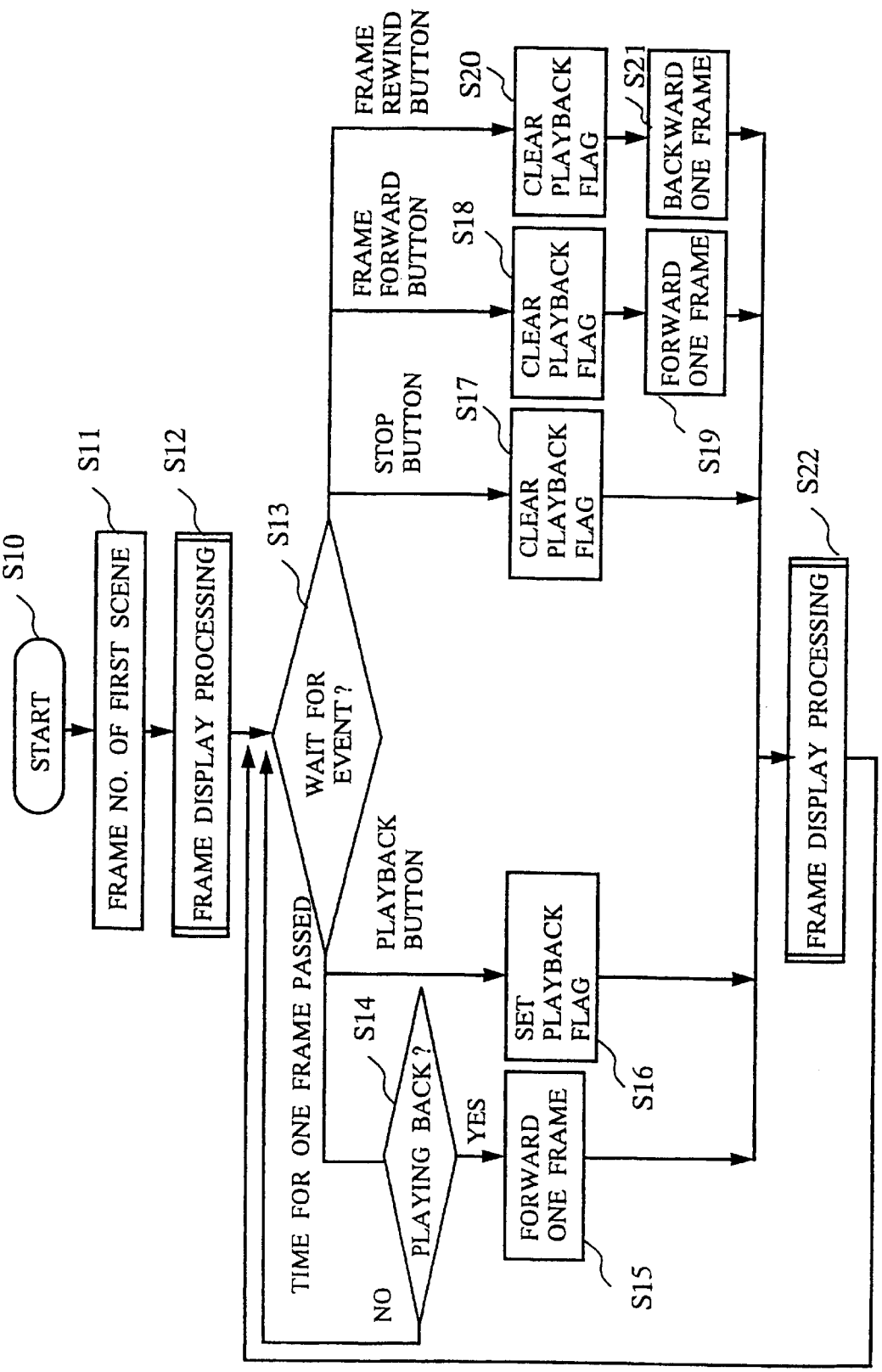
FIG. 4 is a flowchart showing the operation of a moving picture display unit of Embodiment 2.

The operational flow of moving picture display unit 9 of this embodiment is illustrated in FIG. 4.

The processing procedure of moving picture display unit 9 of FIG. 4 is explained.

First, processing starts at step S10, and the starting frame number of the scene is substituted as the current frame number FT at step S11. The display processing is performed for the frame number FT at step S12. Then, an event is waited at step S13. After a time for one frame has passed, a determination is made whether moving pictures are being played back or not at step S14, and if they are being played back, the current frame number FT is forwarded by one at step S15, and the next frame is displayed at step S22. On the other hand, if the moving pictures are not being played back, the procedure returns to step S13 and again waits for the event.

When the playback button is pressed while waiting for the event at step S13, a playback flag is set at step S16, and the display processing of the frame number FT is performed at step S22.

When the stop button is pressed, the playback button is cleared at step S17, and display processing is performed for the frame number FT at step S22. When the frame forward button is pressed, the playback flag is cleared at step S18, the current frame number FT is forwarded by one at step S19, and the next frame is displayed at step S22.

Furthermore, when the frame rewind button is pressed, the playback button is cleared at step S20, the current frame number FT is returned by one at step S21, and the previous frame is displayed at step S22.

Figure 5:
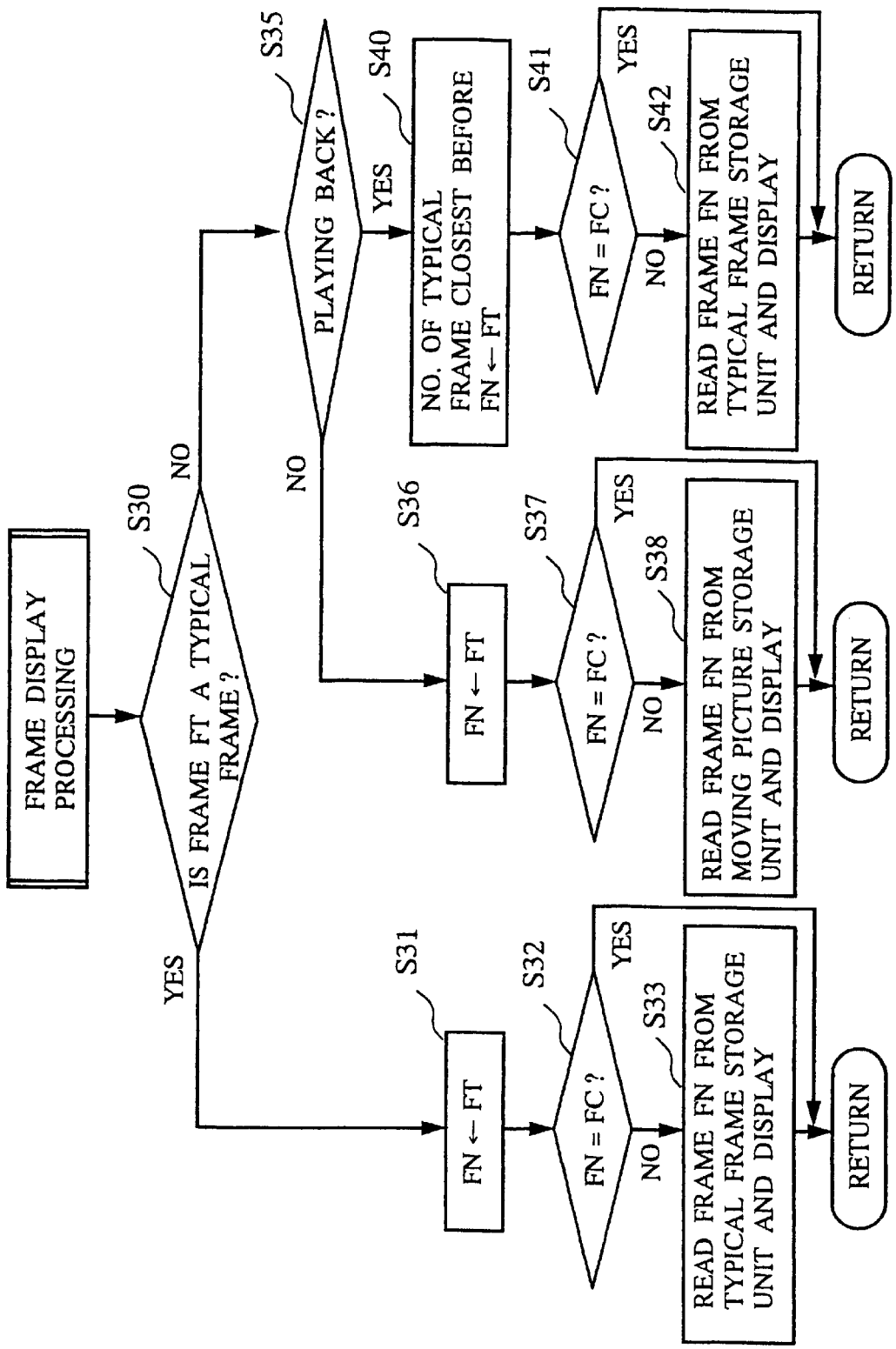
FIG. 5 is a flowchart showing the flow of frame display processing of the moving picture display unit of Embodiment 2.

The flow of frame display processing of moving picture display unit 9 is shown in FIG. 5.

The frame display processing procedure of FIG. 5 is explained.

At step S30, whether or not the frame of the current frame number FT is a typical frame is determined. If it is a typical frame, the current frame number FT is substituted as the frame number FN to be displayed. At step S32, the frame number FN to be displayed is confirmed if it is the same as the currently displayed frame number FC, and if it is not, the picture data of the frame of the frame number FN is read from typical frame storage unit 22 and displayed on moving picture display unit 9 at step S 33.

When it is not a typical frame at step 30, playing back or not is judged at step S35. When it is not being played back, the current frame number FT is substituted as the frame number FN to be displayed at step S36. At step S37, the frame number FN to be displayed is confirmed to be the same or not as the currently displayed frame number FC, and if not, the picture image data of the frame number FN to be displayed is read from sequential access type moving picture storage unit 2 at step S38, and displayed on moving picture display unit 9.

When being played back at step S35, the number of the closest typical frame before the current frame number FT is substituted for the frame number FN at step S40. AT step S41, the frame number FN to be displayed is confirmed whether it is the same or not as the currently displayed frame number FC, and if not, the picture data of the frame of the frame number FN is read from typical frame storage unit 22 at step S42, and displayed on moving picture display unit 9.

When the stop, frame forward, or frame rewind button is pressed, processing is executed in the order of step S36, step S37, step S38 if it is not the typical frame, and if it is the typical frame, the processing is executed in the order of step S31, step S32, step S33.

When moving picture display unit 9 is configured in this manner, only selected typical frames are read in computer 23 memory, that is, typical frame storage unit 22 to facilitate the playing back and editing work.

(4) Executing Editing Operation

The operation of scene processing, concatenating, or compositing for this embodiment are basically the same as those of conventional non-linear editing system.

(5) Creating Moving Pictures

The new scene information created as the result of editing is stored in scene information storage unit 5. Based on the scene information, moving picture creation unit 11 creates moving pictures which are the editing result on the video tape, etc., of sequential access type moving picture storage unit 2.

The scene information of the moving pictures to be output is processed, concatenated, and compositited based on those scenes to be input. Moving picture creation unit 11 inputs one or more scenes stored in sequential access type moving picture storage unit 2, and then outputs edited scenes to another sequential access type moving picture storage unit 2. For compositing two scenes, these scenes are to be stored in separate sequential access type moving picture storage unit 2. Moving picture creation unit 11 reads scenes in the order of time axis defined by the scene information and plays them back. If processing is demanded for the scene information, the result of processing based on the demand is output. Also, if composition is demanded, the scene is played back by two sequential access type moving picture storage unit 2 respectively, and then composited result is output. In this way, the moving pictures of edited scenes are created in sequential access type moving picture storage unit 2 for output.

According to the embodiment, as thus far described, because editing can be performed without compressing the moving pictures digitally and reading them into the computer memory, the time required for digitally compressing moving pictures can be saved.

Moreover, an extension board for compressing moving pictures digitally or a large capacity memory for storing digitally compressed data are no longer required.

Embodiment 3

According to Embodiment 2, editing can be performed without digitally compressing moving pictures into data and storing the data in a computer memory. However, in Embodiment 2, because the moving pictures as the edited result are obtained by dubbing the moving pictures from one VTR to another VTR, two or more VTRs must be connected to the computer. On the other hand, according to Embodiment 1, although one VTR can be connected to the computer because digitally compressed moving picture data can be stored in the computer memory, a large capacity memory has to be incorporated in the computer.

In addition to the editing computer, a server computer provided with a large capacity memory is attached, and the digitally compressed moving picture data is stored in the server computer, and by using the moving picture data, a configuration which enables playing back and editing moving pictures by the apparatus not equipped with a digital moving picture compression unit or moving picture storage unit is outlined below.

Figure 6:
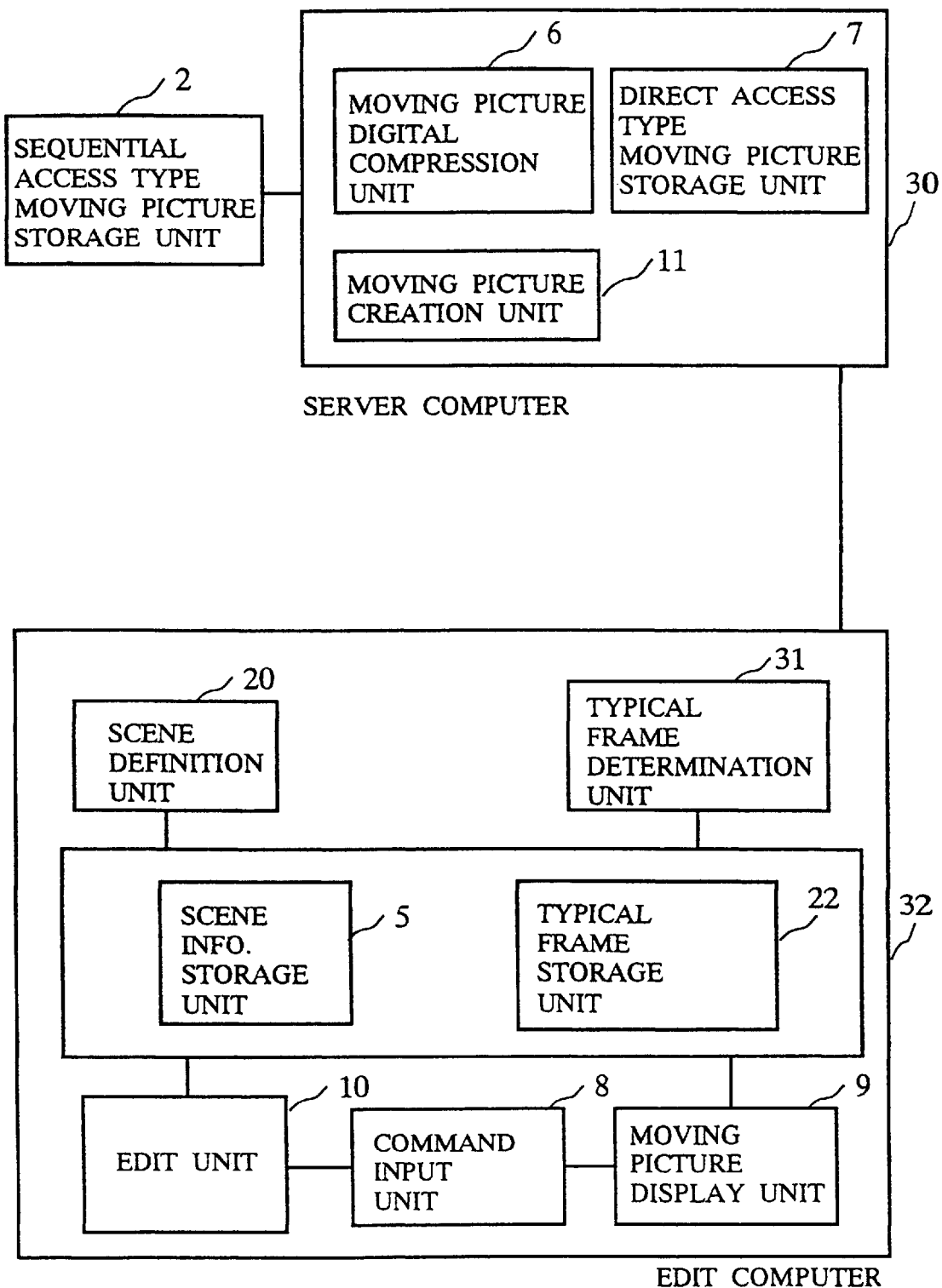
FIG. 6 shows a configuration of a moving picture playback apparatus of Embodiment 3.

FIG. 6 shows a configuration of a moving picture playback apparatus of Embodiment 3.

The moving picture playback apparatus is configured by a server computer 30 connected to the communication network and an editing computer 32. Server computer 30 is connected to sequential access type moving picture storage unit 2 such as a VTR.

Server computer 30 includes a moving picture digital compression unit 6, a direct access type moving picture storage unit 7 and a moving picture creation unit 11. Also, editing computer 32 includes a scene definition unit 20, scene information storage unit 5, a typical frame determination unit 31, a typical frame storage unit 22, a command input unit 8, a moving picture display unit 9, and an editing operation execution unit 10.

The operation of this Embodiment is set forth below.

(1) Defining a Scene

The definition method of the scene is basically the same as the operation of the conventional non-linear editing system.

For defining a scene, firstly, a medium such as a video tape which recorded moving pictures is set to the sequential access type moving picture storage unit connected to server computer 30. Although it is supposed that server computer 30 is geographically far from editing computer 32, because moving pictures can be carried by the medium such as the video tape, a unit such as mailing can be selected.

(2) Reading Moving Pictures

For reading moving pictures, the moving pictures are read from sequential access type storage unit 2 by moving picture digital compression unit 6, and then digitally compressed, and the compressed data is stored in direct access type moving picture storage unit 7. Typical frame determination unit 31 selects a typical frame, and typical frame storage unit 22 reads a moving picture data of the typical frame among the digitally compressed moving picture data stored in direct access type moving picture storage unit 7 of server computer 30 via the communication network and stores the data.

(3) Displaying a Scene

Moving picture display unit 9 displays scenes by using the typical frame stored in typical frame storage unit 22 of editing computer 32 and the moving pictures stored in direct access type moving pictures storage unit 7 of server computer 30. That is, display is conducted by using typical frames during playback, and when frames other than typical frames must be correctly displayed at the time of frame forward, frame rewind, or stop, the data of the frame corresponding to the moving data is read via the communication network, and the frame is displayed.

(4) Executing the Editing Operation

This is basically the same as the operation of the conventional non-linear editing system.

(5) Creating Moving Pictures

As the edited result, a new scene for output is defined, and the scene information is stored in scene information storage unit 5. The scene information is transmitted to server computer 30 via the communication network. At server computer 30, moving picture creation unit 11 creates moving pictures for output based on the scene information and the moving picture data stored in direct access type moving picture storage unit 7. The operation of moving picture creation unit 11 is basically the same as the operation of moving picture creation unit 11 of Embodiment 1.

In this Embodiment, because the moving picture data is transmitted to editing computer 32 as necessary by the communication unit by providing moving picture digital compression unit 6 and direct access type moving picture storage unit 7 to server computer 30, an extension board or a large capacity memory is no longer needed for moving picture digital compression for editing computer 32.

Embodiment 4

The configuration to be next described is that a typical frame is determined based on an event detected by the event detection unit, and the frame is immediately read and stored so as to start edit operation as soon as the shooting ends.

Figure 7:
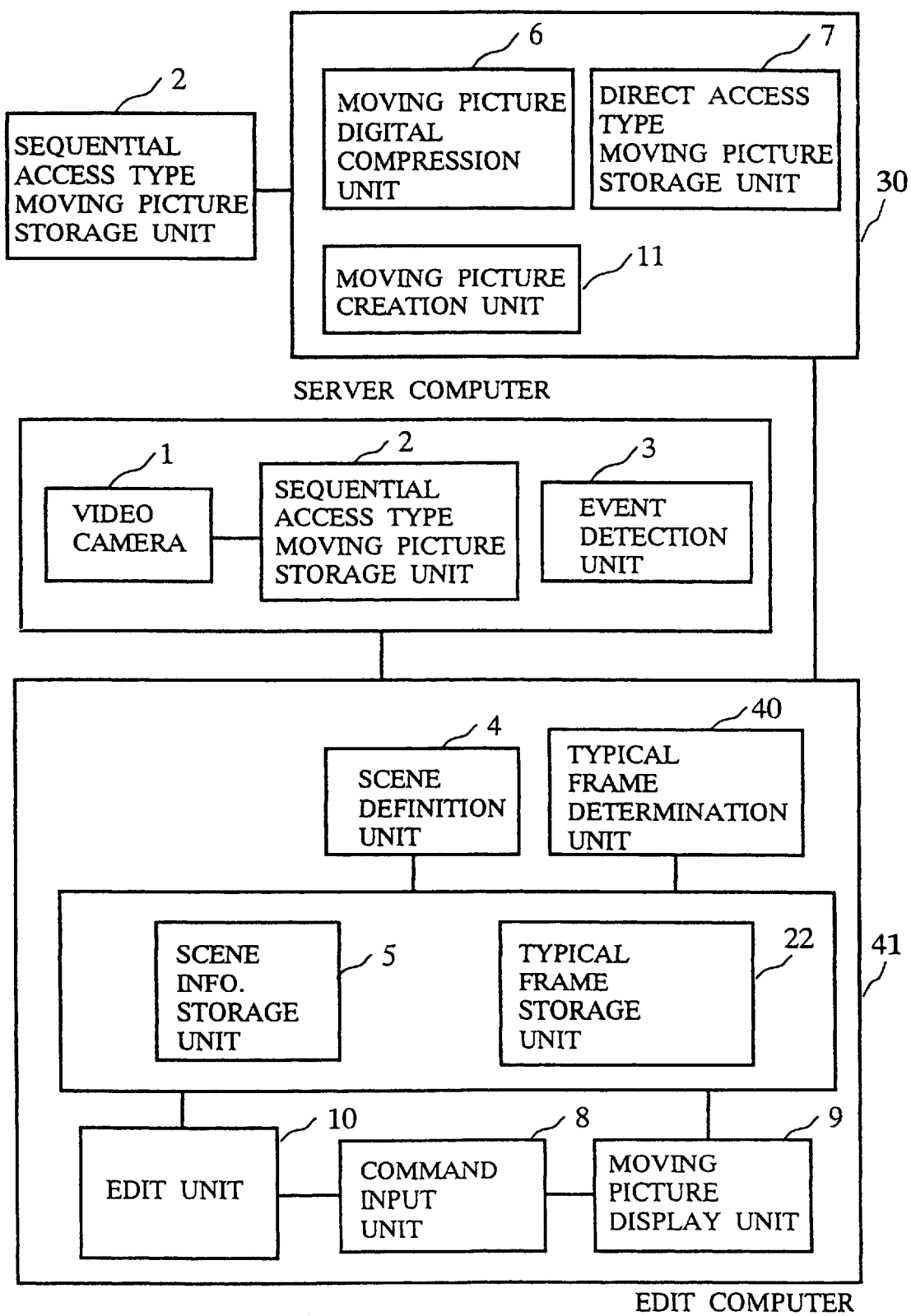
FIG. 7 shows a configuration of a moving picture playback apparatus of Embodiment 4.

FIG. 7 shows a configuration of moving picture playback apparatus of Embodiment 4.

In this configuration, a video camera 1 attached with a sequential access type moving picture storage unit 2 and an event detection unit 3, a server computer 30 and an edit computer 41 are outlined.

The operation of this embodiment is outlined below.

(0) Shooting

Similarly to the operation of shooting of Embodiment 1, event detection unit 3 detects a certain event during shooting and notifies edit computer 41 of the detected event.

(1) Defining a Scene

Similarly to Embodiment 1, when event detection unit 3 detects an event, scene definition unit 4 immediately defines a new scene information with the frame corresponding to the event delimiter, and stores it in scene information storage unit 5.

(2) Reading Moving Pictures

For reading moving pictures, the moving pictures are read by moving picture digital compression unit 6 from sequential access type moving picture storage unit 2 and digitally compressed, and the compressed data is stored in direct access type moving picture storage unit 7. Also, typical frame determination unit 40 selects a typical frame according to the event notified by event detection unit 3 during shooting.

After the typical frame is selected, typical frame storage unit 22 immediately reads the frame from sequential access type moving picture storage unit 2 of video camera 1, and stores.

(3) Displaying a Scene

The operation is basically the same as the scene displaying of Embodiment 3. However, it is possible to display scenes using sequential access type moving picture storage unit 2 similarly to Embodiment 2, until the reading of previously mentioned moving pictures is completed.

(4) Executing the Edit Operation

The operation is basically the same as the creation of moving pictures of Embodiment 3.

According to this Embodiment, event detection unit 3 detects an event during shooting, and scene definition unit defines the scene at the same time, and typical frame storage unit 22 reads the typical frame from video camera 1 and stores, therefore, the time for defining the scene and reading moving pictures can be saved, and edit operation can be immediately started as soon as the shooting ends.

Embodiment 5

Figure 8:
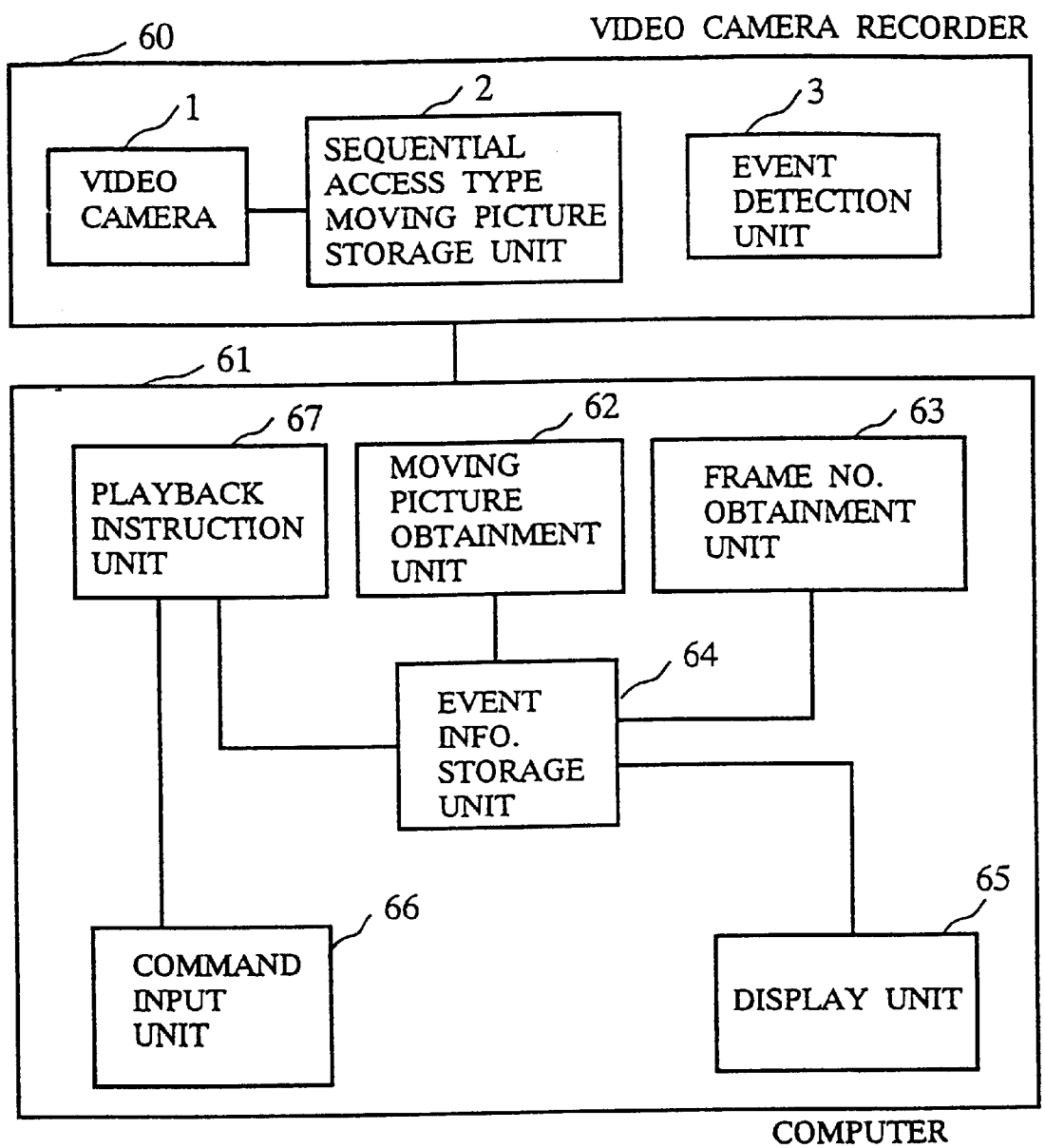
FIG. 8 shows a configuration of a moving picture collection apparatus of Embodiment 5.

A configuration of a moving picture collection apparatus is now explained. Based on an event detected by event detection unit 3, the frame number and moving picture data at the time of event occurrence are obtained, and the event is specified by storing them in event information storage unit 64, and the contents of the moving pictures corresponding to the event can be quickly confirmed FIG. 8 shows a configuration of the moving picture collecting apparatus of Embodiment 5.

The moving picture collection apparatus of this embodiment is configured by a video camera recorder 60 attaching sequential access type moving picture storage unit 2 and event detection unit 3 to video camera 1 and a computer 61 connected to it, similarly to the moving picture playback apparatus of Embodiment 1. Computer 61 is equipped with a moving picture obtainment unit 62 for obtaining a moving picture at an arbitrary point from video camera recorder 60, a frame number obtainment unit 63 for obtaining the frame number showing the position on the video tape which is being played back or recorded at that time by video camera recorder 60, and an event information storage unit 64 for storing the frame number obtained by frame number obtainment unit 63 or the moving picture data obtained by moving picture obtainment unit 62 by correlating with the event detected by event detection unit 3.

Furthermore, computer 61 is provided with a display unit 65 for displaying the event information stored in event information storage unit 64, a command input unit 66 for the user (a person using this moving picture collection apparatus) to input commands such as an event selection end instruction, and a playback instruction unit 67 for specifying the frame number to video camera recorder 60 and instructing to playback from the position on the video tape corresponding to the frame number.

The operation of this embodiment is set forth below.

The user performs shooting using video camera recorder 60.

At this time, event detection unit 3 detects the change of shooting subject, the change of video camera 1, or the event of user operation, and notifies computer 61 of the type of the event. The operation for event detection unit 3 to detect events is the same as that of Embodiment 1.

When an event is detected by event detection unit 3, the event occurrence and the type of the event are notified computer 61 from video camera recorder 60. Upon receiving the notification of event occurrence, computer 61 immediately obtains the frame number at that time from video camera recorder 60 by frame number obtainment unit 63, and obtains the moving picture data at that time by moving picture obtainment unit 62. These frame numbers and the moving picture data are correlated with the event type and stored in event information storage unit 64.

Figures 9, 10:
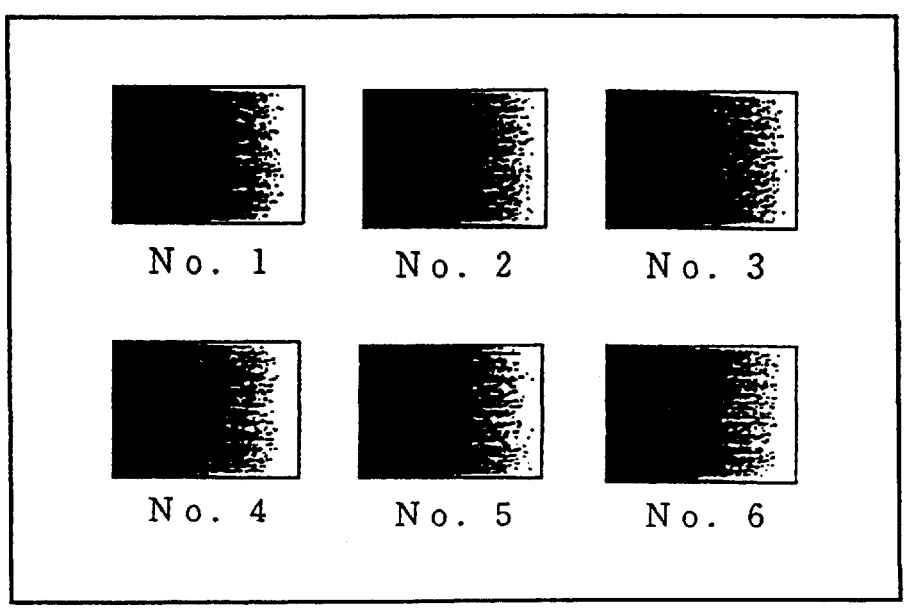
FIG. 9 is a diagram explaining an event information stored in an event information storage unit of Embodiment 5.
FIG. 10 is a diagram explaining an index displayed on a display unit of Embodiment 5.

FIG. 9 explains the event information stored in event information storage unit 64. In this figure, events of recording start and recording end, which are the operation of the user during shooting, are correlated with the frame numbers and stored. Furthermore, the moving picture data at that time is stored for the event at the recording start.

When the shooting ends, the user confirms the contents of the shot moving pictures.

Computer 61 creates an index based on the event information stored in event information storage unit 64, and displays it on display unit 65.

FIG. 10 explains the index to be displayed on display unit 65. In the figure, a frame corresponding to the event at the shooting start is selected as the element of the index. The moving picture data corresponding to the elements of each index are aligned and displayed as the index.

By looking at the index, the user selects a desired element by clicking the position, for instance, on which the moving picture data is displayed. When the element is selected, the frame number corresponding to the element can be determined by referring to event information storage unit 64, playback instruction unit 67 notifies video camera recorder 60 of the frame number, and instructs to playback from the position of this frame number.

When the frame number is notified from computer 61, and an instruction is given to playback from that position, video camera recorder 60 instructs sequential access type moving picture storage unit 2 to rewind or forward up to the position of the specified frame number. As the positioning to the specified frame number position is ended, a next instruction is given to sequential access type moving picture storage unit 2 to start playback.

Based on the events collected by the moving picture collection apparatus, the frame number and the moving picture data at the event occurrence are obtained, and stored in event information storage unit 64 attached to the moving picture collection apparatus so as to specify the event and quickly confirm the content of the moving pictures corresponding to the event. However, it is possible to send the information stored in event information storage unit 64 to the moving picture playback apparatus of Embodiments 1 to 4 and perform moving picture edit processing such as playback, concatenation, or composition of moving pictures by this moving picture playback apparatus.

For sending the information stored in event information storage unit 64 to the moving picture playback apparatus of the previous Embodiments 1 to 4, the previously mentioned moving picture collection apparatus and the moving picture playback apparatus can be connected by communication, or the information stored in event information storage unit 64 can be stored in a recording medium such as floppy disks and that recording medium can be set to the moving picture playback apparatus for use.

Figure 11:
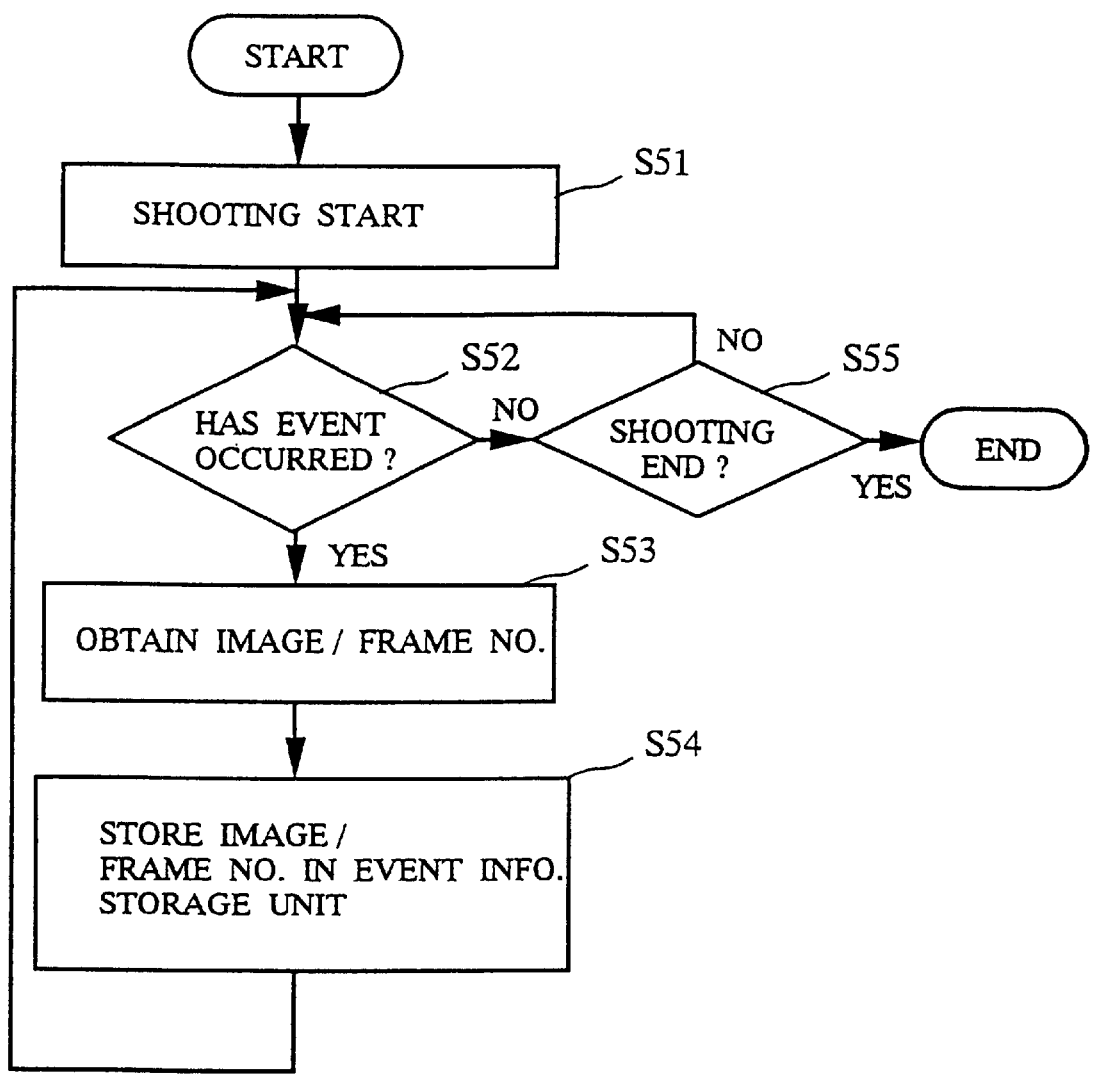
FIG. 11 is a flowchart showing the operation of a moving picture collection apparatus of Embodiment 5.
Figure 12:
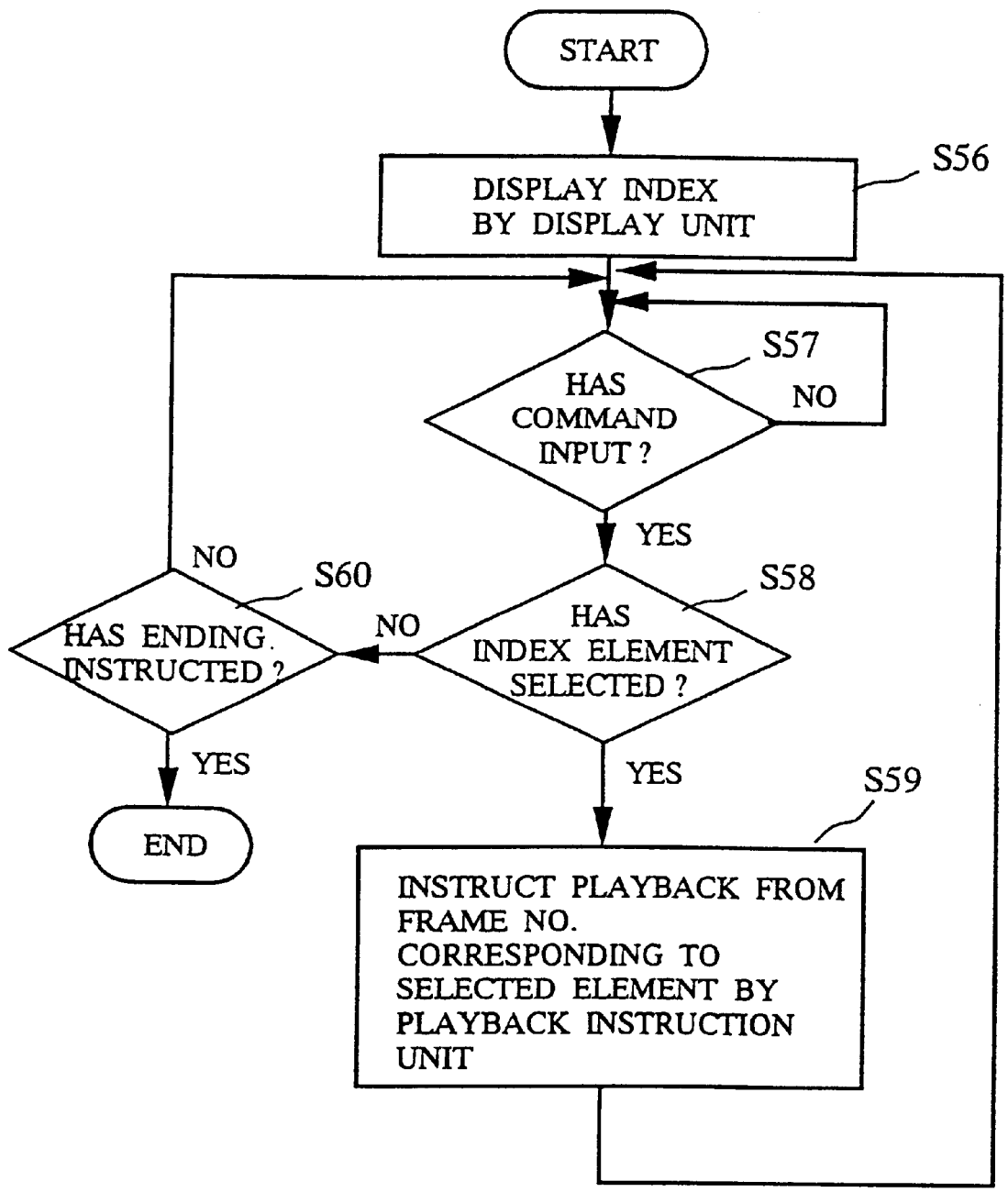
FIG. 12 is a flowchart showing the operation of the moving picture collection apparatus of Embodiment 5.

With referring to the flowcharts of FIGS. 11 and 12, the procedure of operation processing from event detection to the playback of the moving pictures is explained.

FIG. 11 is a flowchart showing the processing flow from obtaining the moving picture data and the frame number at the time of event occurrence based on the event detected by event detection unit 3, and then storing in event information storage unit 64.

Firstly, at step S51, the user starts shooting using video camera recorder 60, and the event occurrence is checked at step S52. When the event is detected, the frame number and the moving picture data at the time of event occurrence are obtained at step S53.

Then, the frame number and the moving picture data are stored in event information storage unit 64 at step S54, and the occurrence of a next event is checked again at step S52. When no event is detected, shooting end or not is checked at step S55, and if it is not a shooting end, event occurrence is again checked at step S52, and the operation ends if it is the shooting end.

FIG. 12 is a flowchart showing the processing flow of confirming the contents of the moving pictures the user shot.

At step S56, the index created based on the frame number and the moving picture data stored in event information storage unit 64 is displayed on display unit 65, and whether or not a command is input is checked at step S57. When no command has been input, the command input confirmation is checked until a command is input. When a command is input, whether or not the element of the index which is the frame corresponding to the event is checked at step S58.

When the index element is selected, an instruction to playback from the frame number corresponding to the element selected by playback instruction unit 67 is issued at step S59, and after that, whether or not a next command is input is checked again at step S57. When the index element has not been selected, whether or not the end is instructed is checked at step S60, and if ending is not instructed, a command input is again checked at step S57, and the operation ends when the end is instructed.

According to the Embodiment, when an event is detected by event detection unit 3, frame number obtainment unit 63 immediately obtains the frame number at that time, and event information storage unit 64 stores the frame number correlating with the event information. Therefore, the user can playback the moving picture at the time of event occurrence and confirm by referring to the index and selecting the specific event.

Embodiment 6

A configuration of having a unit with which the user can add explanation sentences to each event to Embodiment 5.

Figure 13:
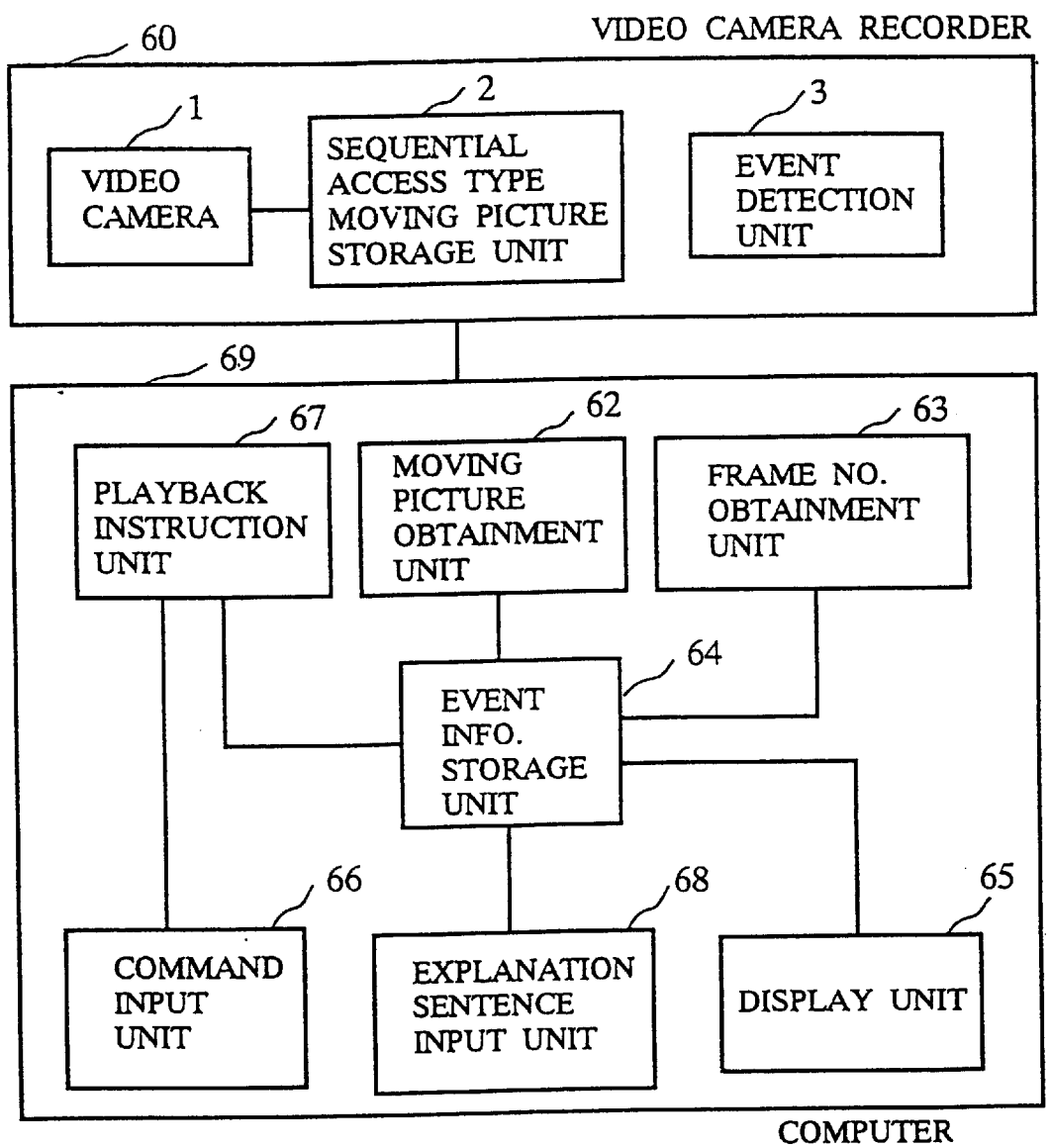
FIG. 13 shows a configuration of a moving picture collection apparatus of Embodiment 6.

FIG. 13 is a configuration showing the configuration of a moving picture collection apparatus of Embodiment 6. To the configuration of Embodiment 5, an explanation sentence input unit 68 is added to this Embodiment.

Explanation sentence input unit 68 inputs an explanation sentence to the event stored in event information storage unit

64. A text input frame allocated for each moving picture corresponding to each event is displayed. The user selects this and inputs an explanation sentence from the keyboard, and the event information attached with the input explanation sentence is stored in event information storage unit 64.

Figure 14:
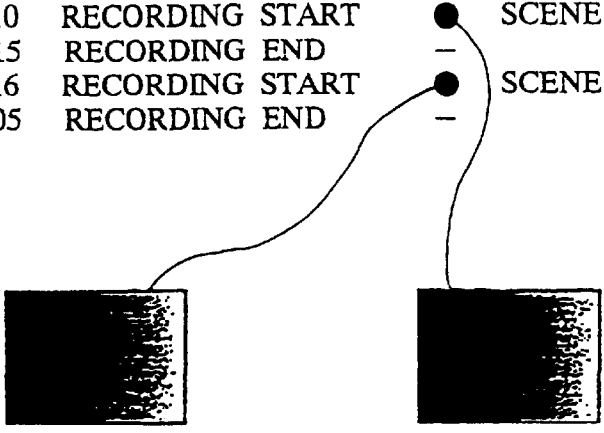
FIG. 14 is a diagram explaining an event information stored in an event information storage unit of Embodiment 6.

FIG. 14 explains the event information stored in this event information storage unit 64.

Figure 15:
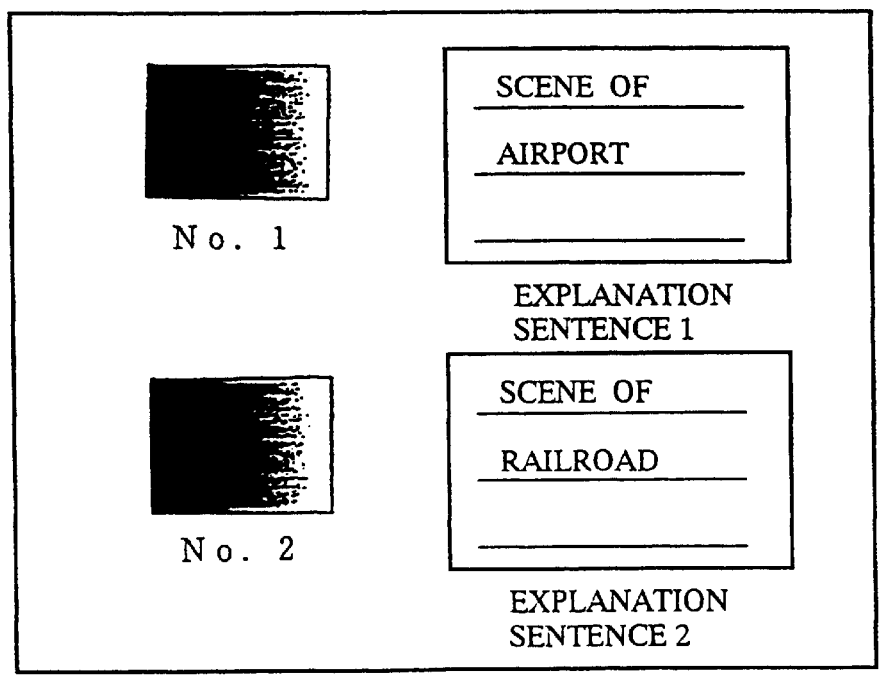
FIG. 15 is a diagram explaining an index displayed on a display unit of Embodiment 6.

FIG. 15 explains the index displayed on display unit 65.

The user inputs the explanation sentence to each of the indexes displayed on display unit 65. In the example of this figure, the explanation sentence of "a scene of the airport" to the first moving picture, and the explanation sentence of "a scene of the railroad" is input to the second moving picture.

By adding and storing the explanation sentences to each event in event information storage unit 64 in this way, when the index is displayed next time, the index with the explanation sentence is to be displayed.

According to this Embodiment, because the explanation sentence the user input can be stored in event information storage unit 64 correlating with the event, the contents of the moving pictures can be confirmed when the shooting has finished, and further, the explanation sentence for a specific frame of each event, e.g., in the moving pictures can be added. In performing edit operation, etc., for these moving picture later on, the index with attached explanation sentences can be displayed to see, therefore, a necessary frame can be quickly found by referring to the explanation sentences.

Embodiment 7

Figure 16:
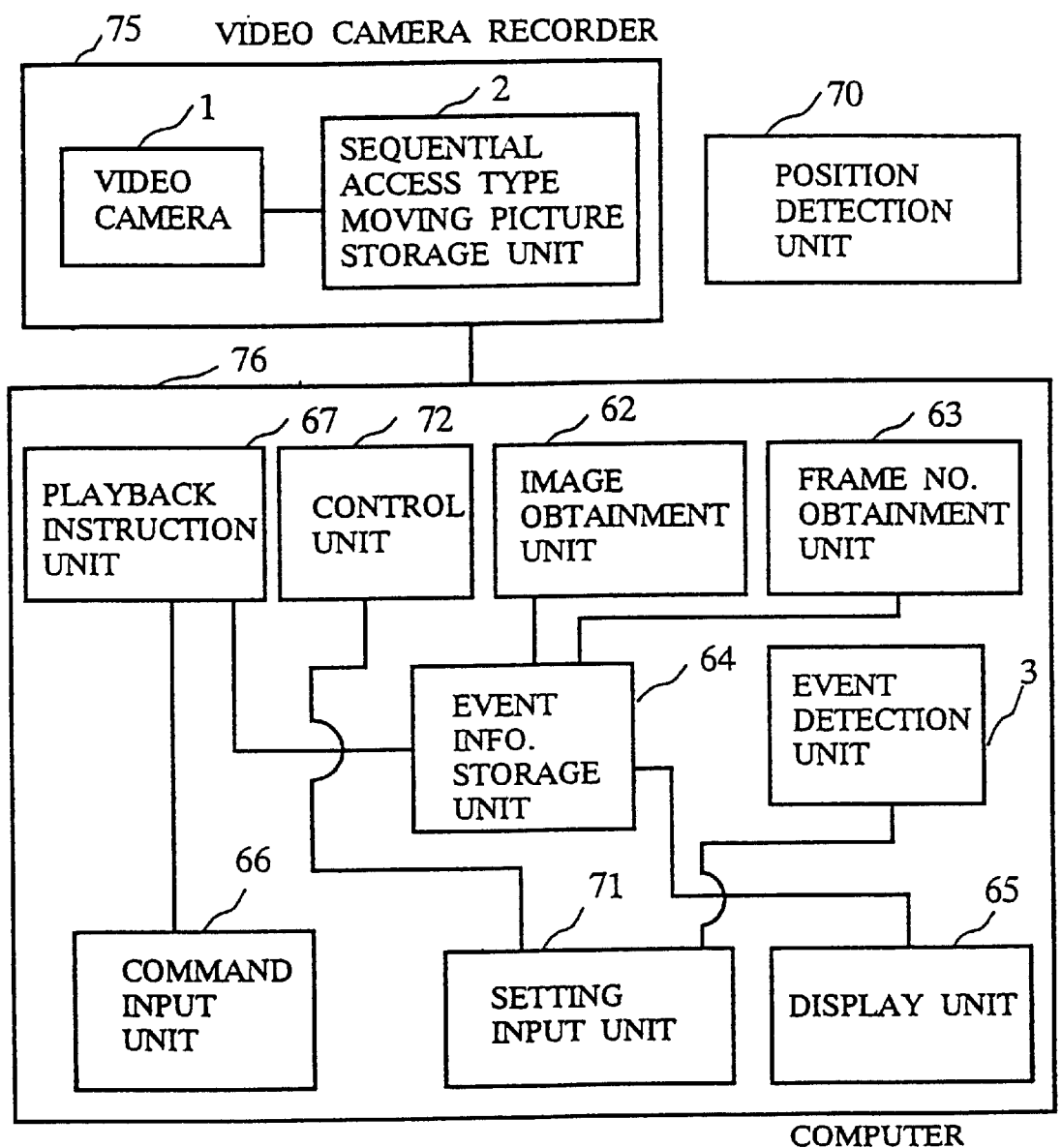
FIG. 16 shows a configuration of a moving picture collection apparatus of Embodiment 7.

FIG. 16 shows the configuration of the moving picture collection apparatus of Embodiment 7. This embodiment assumes that the moving picture collection apparatus is attached to a vehicle, and moving picture information can be collected by performing the shooting while running in the streets.

In this Embodiment, a position detection unit 70 such as the GPS (Global Positioning System) is connected to a RS232C port, etc., of the computer, so as to obtain the longitude and latitude information of the apparatus at any given point, on top of the configuration of Embodiment 5. It is also provided with a setting input unit 71 for setting buildings or area to be shot beforehand. And it has a control unit 72 for controlling, etc., the starting, ending the shooting and the direction of the camera.

The operation of this embodiment will be next explained.

With set input unit 71, the user inputs the spots or area to be shot, or the type of geographical elements to be registered as the index prior to the shooting.

Figure 17:
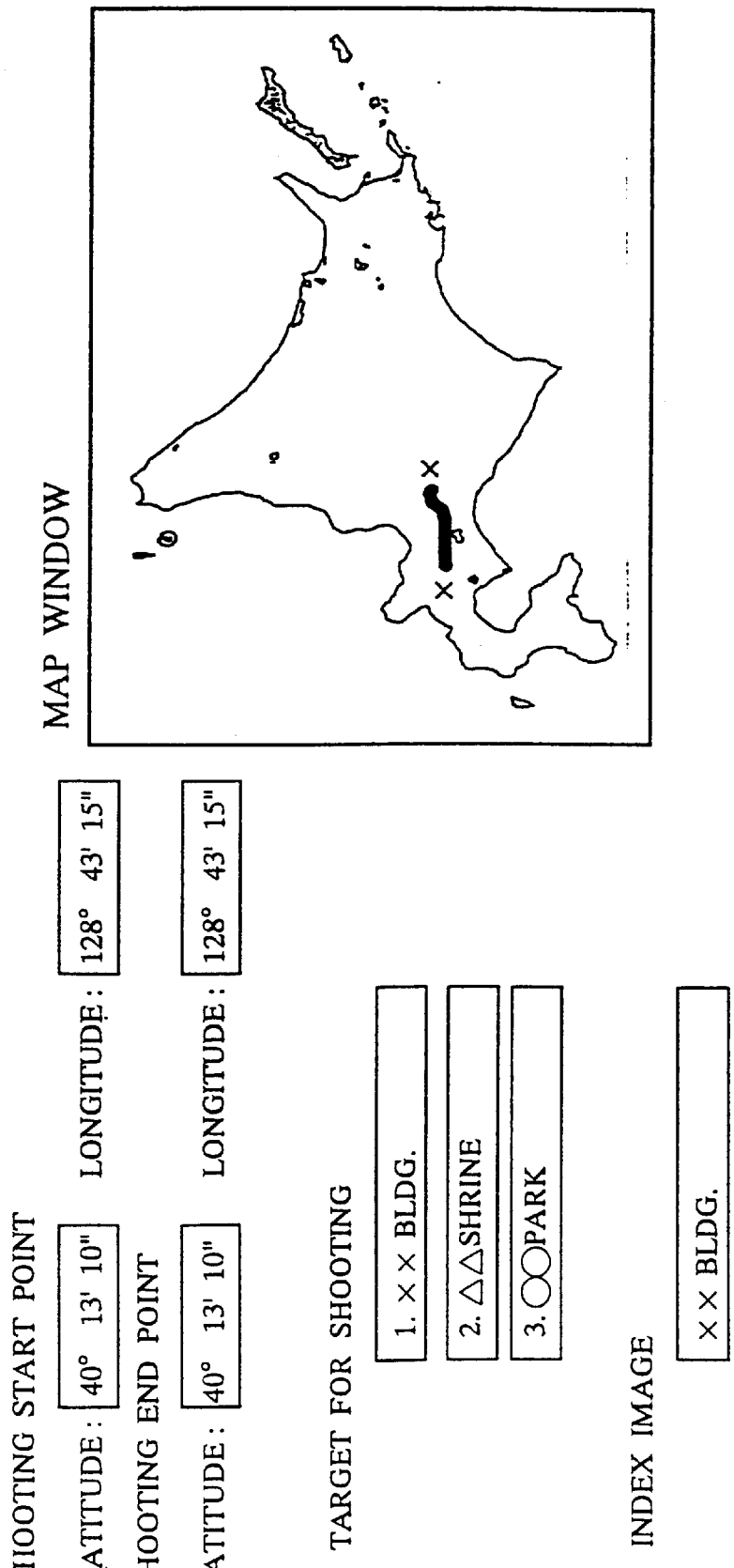
FIG. 17 is a diagram explaining an example of screen of a set input unit of Embodiment 7.

FIG. 17 shows an example of the set input unit 71 screen.

In this example, the longitude, latitude of the shooting start point, and the longitude and latitude of the shooting end point are set. The setting of the longitude and latitude can be directly input with a numeric value, or the numeric values of the longitude and latitude corresponding to the spot can be input by clicking the shooting start point and shooting end point on the map window.

Or, instead of specifying two points of shooting start point and shooting end point, the range of area to be shot can be specified. For instance, a method of specifying an area corresponding to the shooting area by a polygon on the map window, and inputting the longitude and latitude of the apices positions of the polygon can be thought of.

Furthermore, a method of inputting the names of specific buildings, such as XX bldg. or ΔΔ shrine as the shooting subjects can be thought of. In such a case, a database describing the longitude and latitude of each building is prepared, and the longitude and latitude of the buildings whereof the names have been input can be searched from the database and set.

The index is explained next. Because many buildings are recorded when moving pictures are collected for a long time, and when the user wants to find out a moving picture having a certain building, it is not easy to find out the moving picture having the certain building later on. Therefore, a building characteristics of each region, for instance, scenes taking ten or more storied buildings only are separated and registered as the index, then, if a scene of a tall building close to the shooting subject building can be found using the index, it is assumed that the shooting subject scene is located in vicinity. The conditions for geographical elements to be registered as the index are specified by set input unit 71. For instance, when a condition such as "10 or more storied buildings" is input, the geographical element satisfying the condition within the shot area is selected by searching the database for each geographical element. The longitude and latitude information selected in this way can be set.

The operation for the shooting is explained next. For shooting, video camera 1 is attached to the roof or the side of the vehicle, for instance, and computer 76 is set in the vehicle, and they are connected with a cable. It is configured in such a way that video camera 1 can control the shooting start or end by sending a control signal from computer 76 via the cable. Video camera 1 is attached to an electric base so that its direction can be controlled from the instruction of computer 76.

Position detection unit 70 detects the longitude and latitude information of the current position of the vehicle periodically, for instance, at every minute. Event detection unit 3 compares the longitude and latitude information of the current position of the vehicle detected by position detection unit 70 with each position information set by set input unit 71, and when a certain event is detected, reports the event occurrence and the type of the event. The events to be detected are; approach of the vehicle to the shooting start, end positions, entry of vehicle into the shooting area, leaving of the vehicle from the shooting area, an approach of the vehicle to the building which is the shooting subject, an approach of the vehicle to the building which is to be registered as the index, and so on.

When an event of approach to the shooting start position or entry into the shooting area is reported, control unit 72 sends a command for shooting start to video camera 1. When an event of approach to the shooting end point or the leaving from the shooting area is reported, control unit sends a command of shooting end to video camera 1. In this way, the area automatically set can be shot without the user's performing the operation of shooting start or end while moving in the vehicle.

When a building to be shot is specified, event detection unit 3 detects the approach of the vehicle to the building assumed to be the shooting subject as an event and reports. Upon receiving the report of this event, control unit 72 sends a command of shooting start to video camera 1, and controls video camera to be directed toward the building assumed to be the shooting subject.

The direction of the video camera 1 can be controlled in the following way. When the event of approaching to the specific building is reported from event detection unit 3, control unit 72 obtains the longitude and latitude information of the building based on the information set by set input unit 71. Then the information of the current vehicle position is obtained by position detection unit 70. Furthermore, using the jairo sensor, etc., the direction of the vehicle is also obtained. Concerning the information of the vehicle direction, there is a method of deciding the direction toward which the vehicle is to proceed by analyzing the change of the vehicle position for the past few seconds, and estimating the direction as the direction of the vehicle.

When the position of the building to be shot and the position and direction of the vehicle are determined, the direction of video camera 1 to be set is determined based on them. Based on the determined direction, control unit 72 controls the base on which video camera 1 is attached and changes the direction of video camera 1, so that the shooting subject comes into the area of shooting for video camera 1.

When the building to be registered as the index is specified, event detection unit 3 detects an approach of the vehicle to the building to be registered as the index as the event and reports. When this event is reported, control unit 72 controls the direction of video camera 1 so that the building comes into the shooting area, and moving picture obtainment unit 62 obtains the moving picture data at that time and stores in event information storage unit 64 with the event information.

Examples of event information stored in event information storage unit 64 by the above mentioned operation is shown in FIG. 18.

The operation of apparatus for the user to confirm the shot content after the shooting ends is explained next. On display unit 65, the index as shown in FIG. 19 is displayed based on the event information stored in event information storage unit 64. When a moving picture corresponding to one event among the displayed list is clicked, video camera recorder 75 is controlled and the corresponding moving picture is played back. This is the same as for Embodiment 5.

Embodiment 8

The moving picture collection apparatus for this Embodiment is configured by a moving picture input unit such as a video camera, etc., an event detection unit for detecting events, and an event information storage unit which obtains the position information of the shooting apparatus by GPS devise, etc., corresponding to the event detected by this event detection unit and expresses the obtained information by the moving picture or sound, and composites it with the moving picture input from the moving picture input unit and then stores on a video tape and so on.

Figure 20:
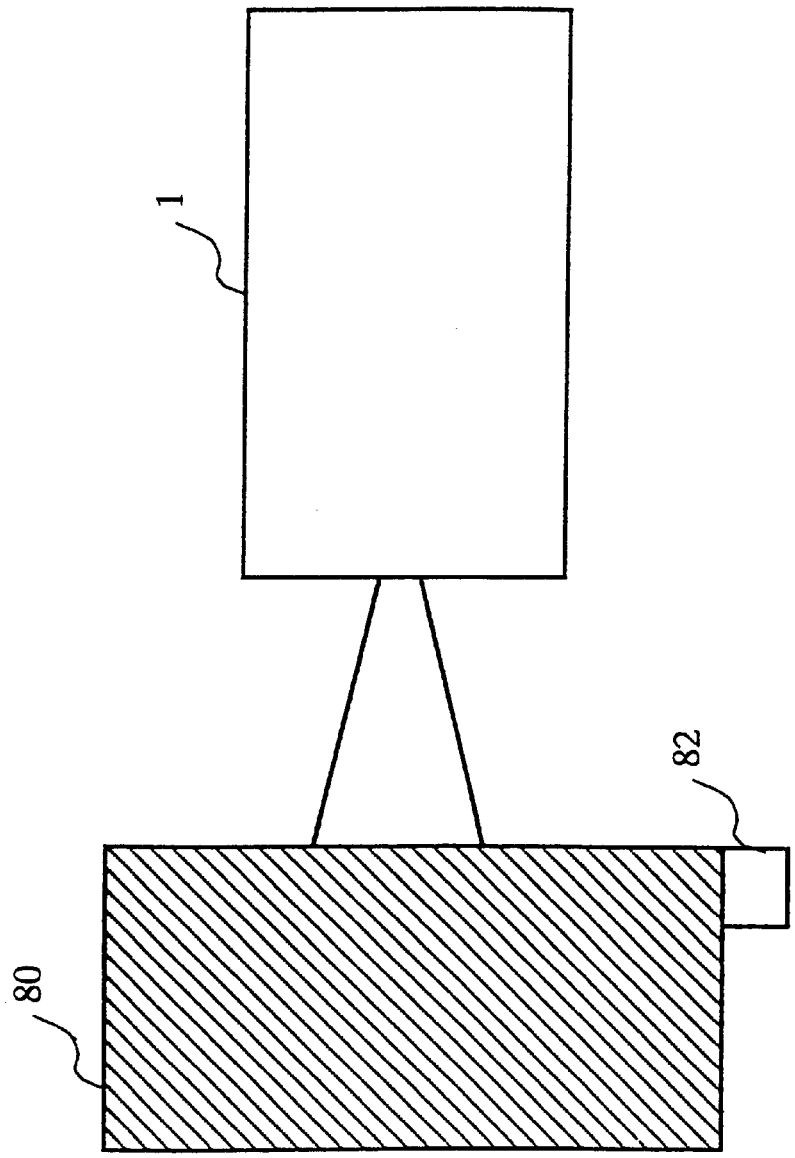
FIG. 20 is a diagram explaining position information attachment filter of Embodiment 8.
Figure 21:
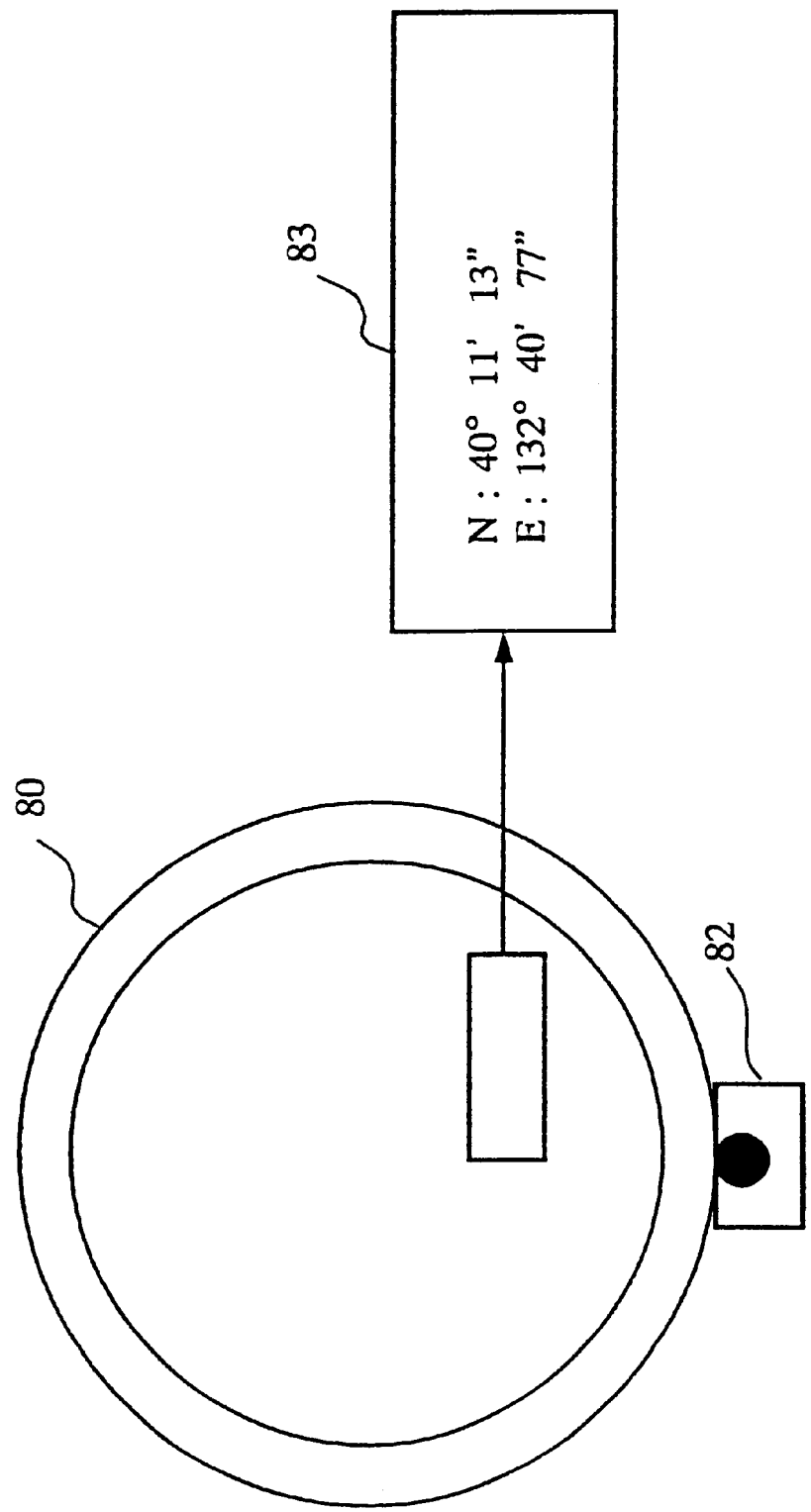
FIG. 21 is a front view of the position information attachment filter of Embodiment 8.

FIG. 20 explains one embodiment example of a position information attachment filter of Embodiment 8, and FIG. 21 shows the front appearance of the position information attachment filter.

The event information storage unit performs composition of the event information and the moving pictures using position information attachment filter 80 shown in FIGS. 20 and 21. The position information attachment filter is cylindrical, and used by attaching it to the front of the lens of video camera 1. Position information attachment filter 80 is made of a transparent body, and a display area 83 in which character strings can be displayed is provided in part of the transparent body and a GPS receiving connector 82 for receiving signals from the GPS device and so forth.

Being configured in this way, when an event such as a shooting start or moving of collection apparatus is detected by event detection unit 3, position information attachment filter 80 displays the character strings indicating the position information in the transparent specific area corresponding to the event.

The operation of this embodiment will be next explained.

Position information attachment filter 80 reads the longitude and latitude information received by the GPS device periodically, for instance, at every minute, via GPS receiving connector 82. When the event of shooting start is detected, position information attachment filter 80 converts the longitude and latitude information into character strings and displays them on the transparent specific area. The position information is recorded on the video tape together with the pictures.

After the shooting apparatus has moved, and a gap larger than the predetermined is generated between the currently displayed position information and the position information received from the GPS device, event detection unit 3 reports the event of the shooting apparatus move. When the event of the shooting apparatus move is reported, position information attachment filter 80 updates the display of the position information corresponding to the event.

When the video tape recorded in this way is played back using the VTR, the position information for the shot place is always displayed on the screen. When the forward or rewind function of the VTR is used, a scene with the shot subject point can be quickly found. In the above example, an embodiment of embedding the longitude and latitude information of the shot position in the shot moving picture in character strings is explained, but the longitude or latitude information of the shot position can be converted into the name of the place information, etc., using the geographical information database and then the name of the place can be embedded into the moving picture as character strings.

The above example shows a case in which character strings to be embedded and shot moving pictures are optically composited at the same time as they are shot using a transparent display unit to be recorded on a video tape, it is also possible to record the position information to be embedded and shot moving pictures separately, and to embed the character strings into the moving pictures after the shooting has ended.

Further more, it is obvious that the display of position information is not limited to character strings, a map can be displayed graphically, and symbols can be placed to the corresponding position in the map to indicate the position, or position information can be converted into sound by audio composition to be embedded into the sound track of the video tape, or the similar effect can be obtained by using graphics, symbols, sound, and so on.

Embodiment 9

A moving picture playback apparatus equipped with a playback speed set unit which can playback the moving pictures at an arbitrary playback speed and then confirm the contents of the moving pictures according to the playback speed quickly will be next explained.

Figure 22:
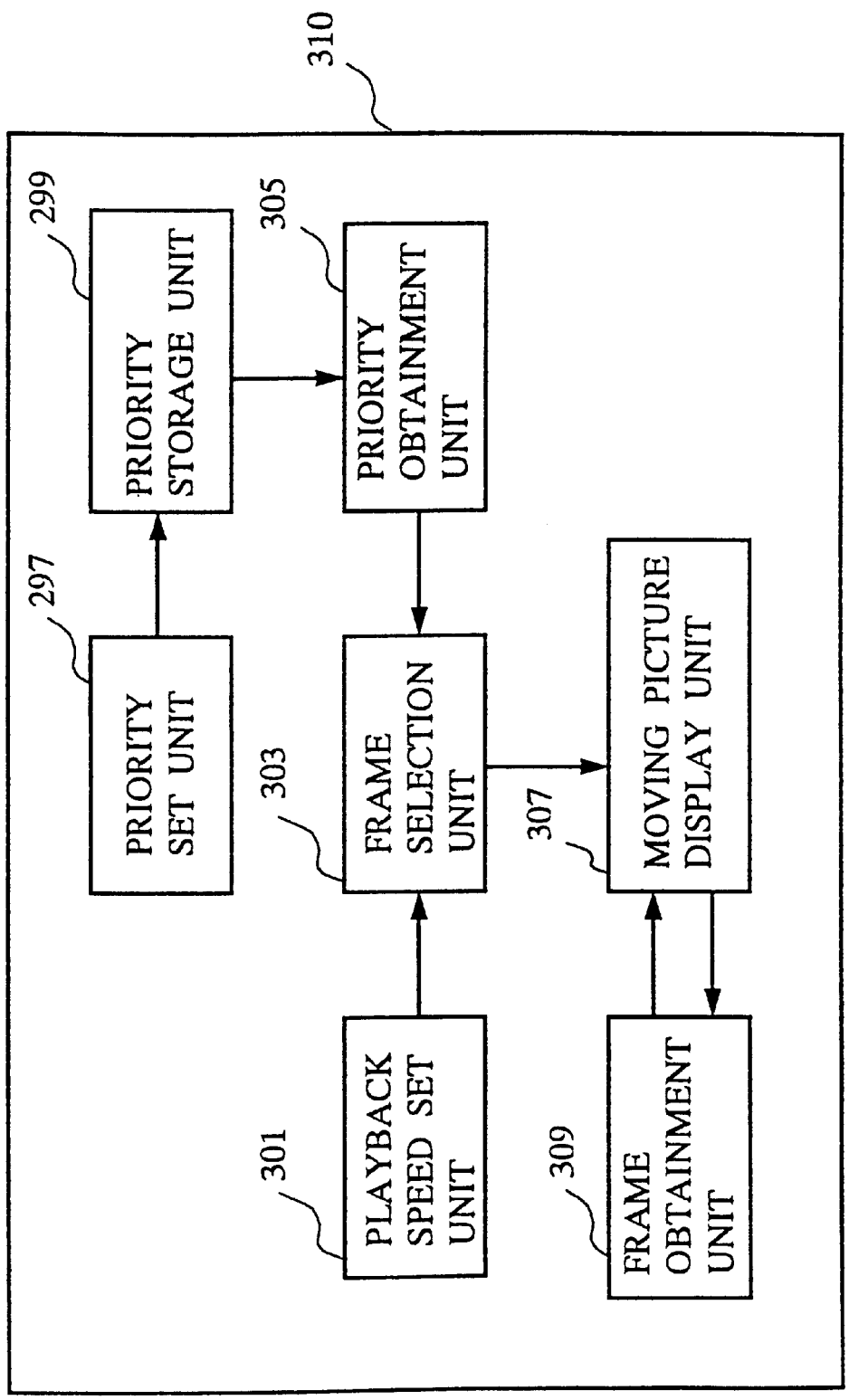
FIG. 22 shows a configuration of a moving picture playback apparatus of Embodiment 9.

FIG. 22 shows a configuration of the moving picture playback apparatus of Embodiment 9.

The moving picture playback apparatus of this embodiment is provided with a frame obtainment unit 309 for obtaining images of the frames of the moving pictures, a priority obtainment unit 305 for obtaining the priority set in the frames of the moving pictures, a playback speed set unit 301 for setting the playback speed, a frame selection unit 303 for discarding/selecting frames of the moving pictures based on the playback speed set by playback speed set unit 301 and by the priority of the frames of the moving pictures obtained by priority obtainment unit 305, and a moving picture display unit 307 for displaying the images of the frames selected by frame selection unit 303 and obtained by frame obtainment unit 309. The priority of the moving picture frames is set by priority set unit 297, and the set priority is memorized in a priority storage unit 299. A computer 310 is provided with them.

Frame obtainment unit 309, for instance, reads the digital data compressed by the moving picture compression system such as MPEG (Motion Picture Experts Groups), and obtains the image data of each frame.

Priority obtainment unit 309 obtains the priority set for each frame. The priority information is set for each frame by priority set unit 297, and memorized in priority storage unit 299 which memorizes priority.

Figure 23:
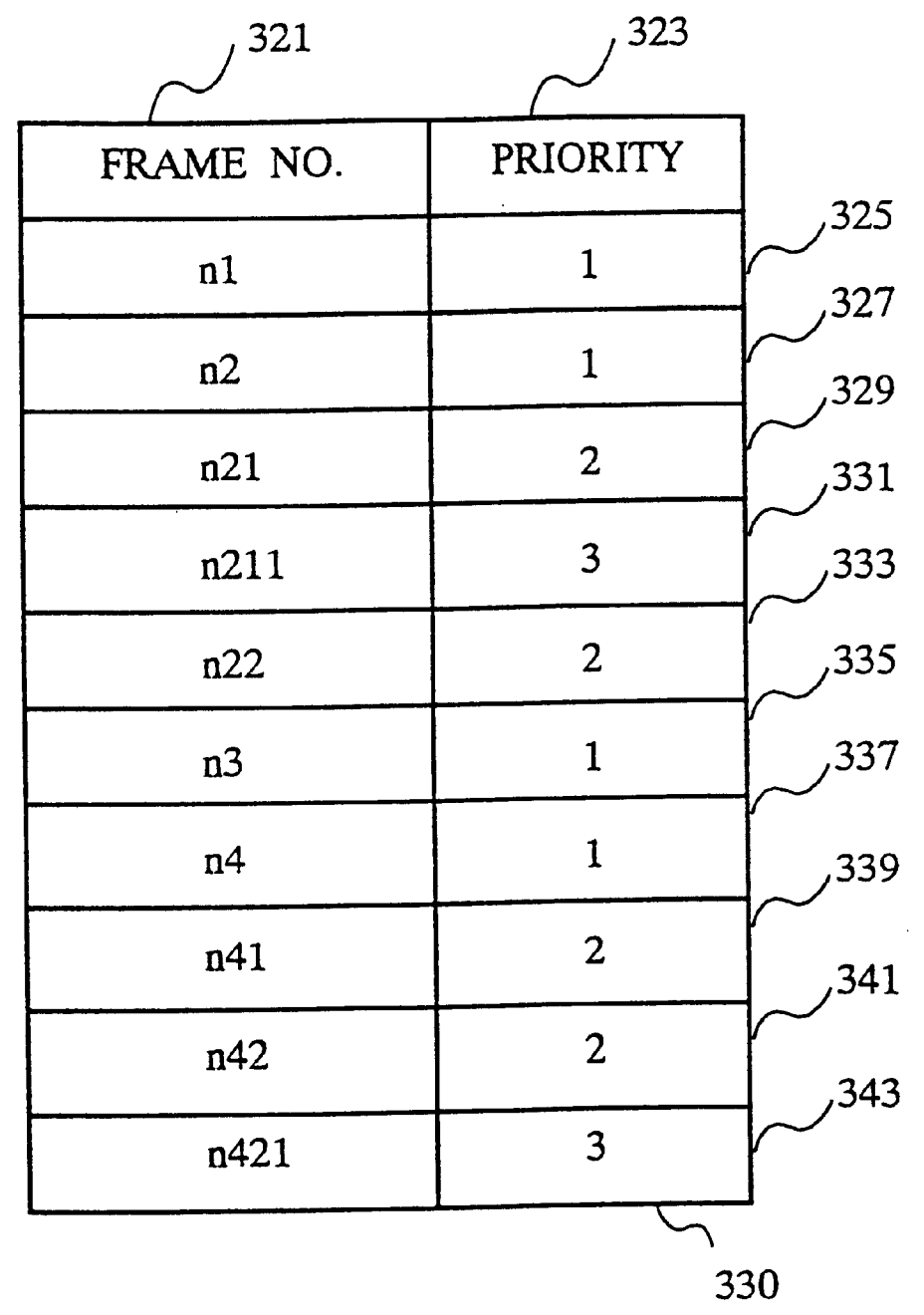

FIG. 23 shows a priority table for memorizing the priority set for each frame of the moving pictures, as one example of the priority storage unit.

In this example, priority table 330 memorizes frame numbers 321 for identifying each frame and priority 323 set for the frames in correlation. In this example, the priority is expressed with numbers, and priority 1 indicates the top priority and the priority becomes lower in the order of priority 2, and priority 3. It is possible to express with letters such as A, B, C, and so on, instead of the numbers. In this example, the top priority 1 is set for the frames with frame numbers n1, n2, n3, and n4. Frame numbers n21, n22, n41, n42 are set as priority 2, and frame number n211 and frame number n421 are set as priority 3. In this example it is assumed that other frames not registered on the priority table are regarded as the lowest priority 4. It is also possible to incorporate a priority table which sets priorities not only for frames with higher priority but for all frames.

Figure 24:
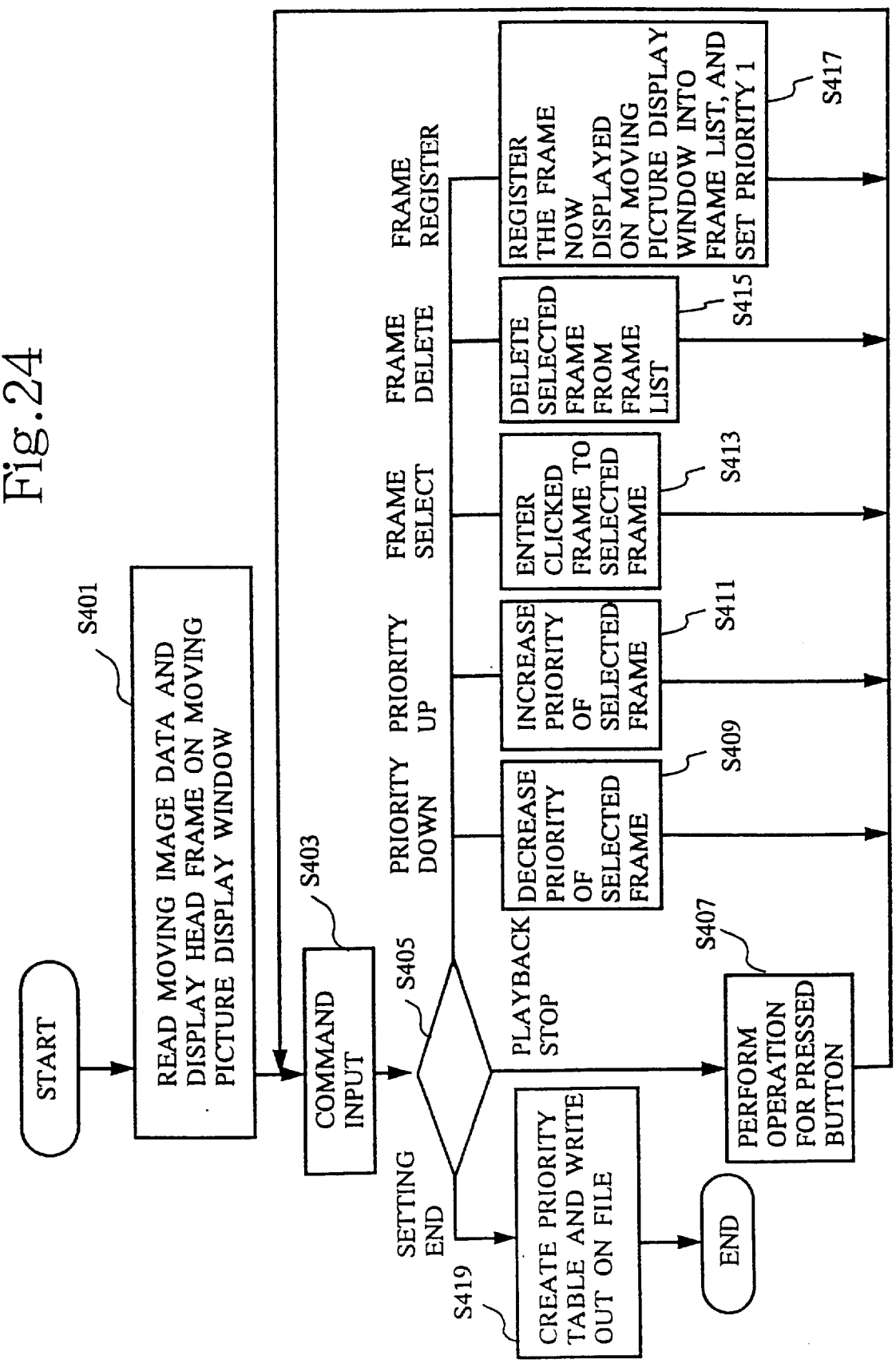
FIG. 24 is a diagram showing an operation flow of a priority set unit of Embodiment 9.
Figure 25:
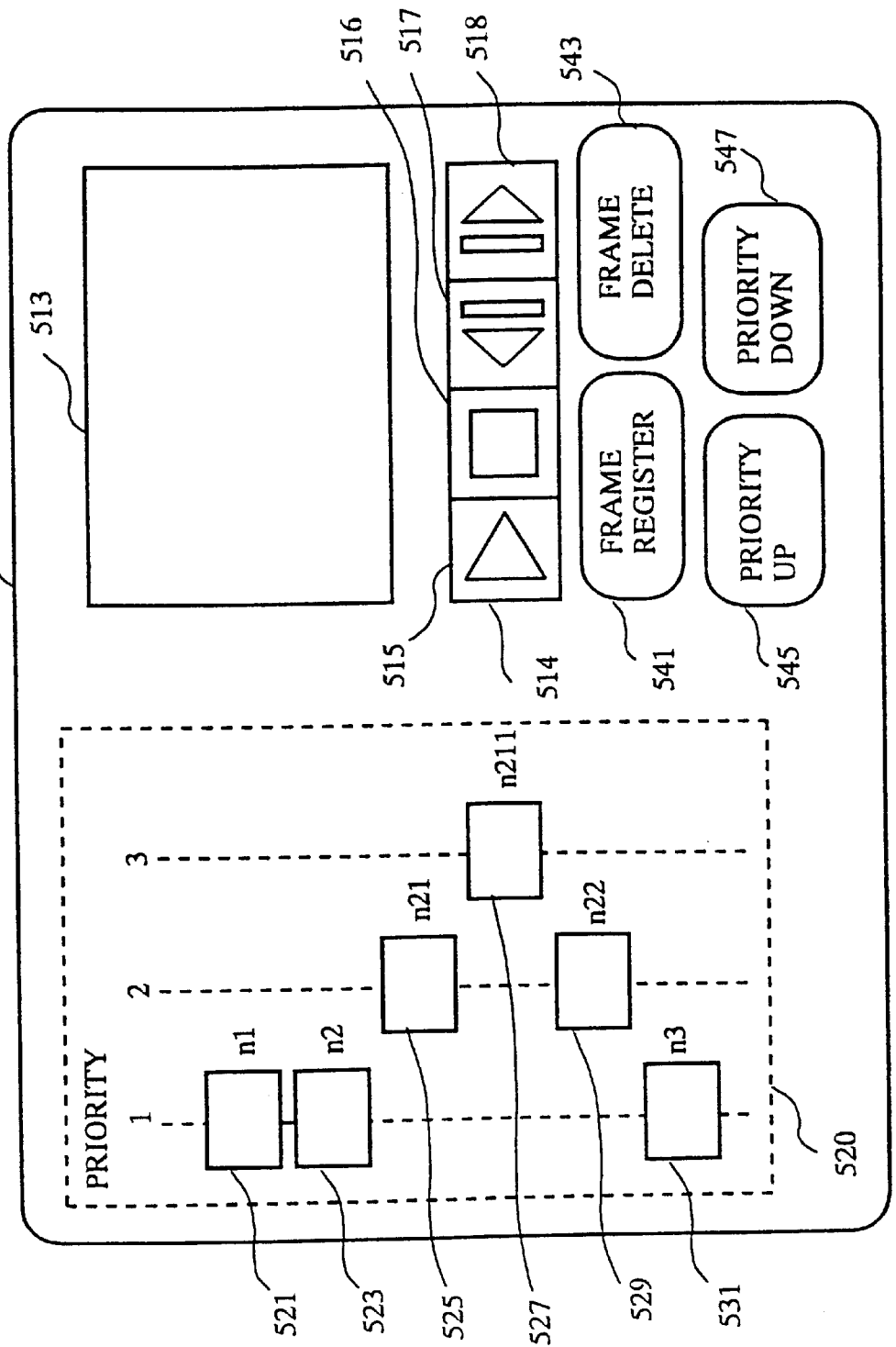
FIG. 25 is a diagram showing an example of screen display of the priority set unit of Embodiment 9.

With referring to FIG. 24 and FIG. 25, the operation flow of priority set unit 297 is explained.

FIG. 24 shows the operation flow of the priority set unit. FIG. 25 shows an example of display screen for setting the priority according to priority set unit 297. A priority set screen 511 is also indicated.

First of all, the moving picture data is read and its leading frame is displayed (S401) on a moving picture display window 513 on the right of priority set screen 511. Then, at S403, a command is input. At S405, a processing corresponding to the input command is performed. First, using a control button such as playback button 515, stop button 516, frame rewind button 517, frame forward button 518, etc., on the bottom of moving picture display window 513, a frame the priority of which to be set is selected and positioned as the current frame (S407). Then, when a "frame register" button 514 is pressed, the frame currently displayed on moving picture window 513 is registered in a frame list 520 on the left screen. The registered frame becomes the frame in selected condition. On frame list 520, frames with higher priority are displayed on the left, and frames with lower priority are displayed on the right. Priority 1, which is the top priority is first set for the frame added to frame list 520, and the images corresponding to the frames are displayed (S417) on the leftmost side of frame list 520, as indicated at 521, 523, and 531. When a "Priority Down" button is pressed, the priority of the selected frame downs, and the position of the frame moves rightwards (S409) as 525 on frame list 520 accordingly. Similarly, when a "Priority Up" button 545 is pressed, the priority ups, and the position of the frame moves leftwards (S411) on frame list 520 accordingly. In order to change the frame in the selected condition, frame selection is performed (S413) by clicking a frame on the frame list. Frame selection is the operation which makes a frame registered in frame list 520 to the selected condition. When a "frame delete" button 543 is pressed, the frame in the selected condition currently is deleted from the frame list. The deleted frame is deleted from priority table 330 when the setting ends.

When the display is made using frame list 520 in this way, the priority set for each frame can be confirmed visually by the image position displayed in the frame list.

When the priority setting is complete, the result is stored in the file (S419) as the priority table as shown in FIG. 23.

Although buttons to be used for ending the setting are not illustrated in FIG. 25, the priority setting is to be completed by such operations as the closing of the window which displays this screen, or by the predetermined operations provided by the system.

Frames with higher priority mean the frames to be displayed without being omitted during forwarding or rewinding, and frames with lower priority mean frames which can be omitted during forwarding or rewinding.

Setting the priority to be high or low is described below.

As an example of setting the priority high or low suited to the moving picture playback apparatus of this embodiment, there is a method of defining a scene for the moving picture, and setting a high priority for the first frame of each scene.

The case of applying this method is explained in concrete below.

Figure 26:
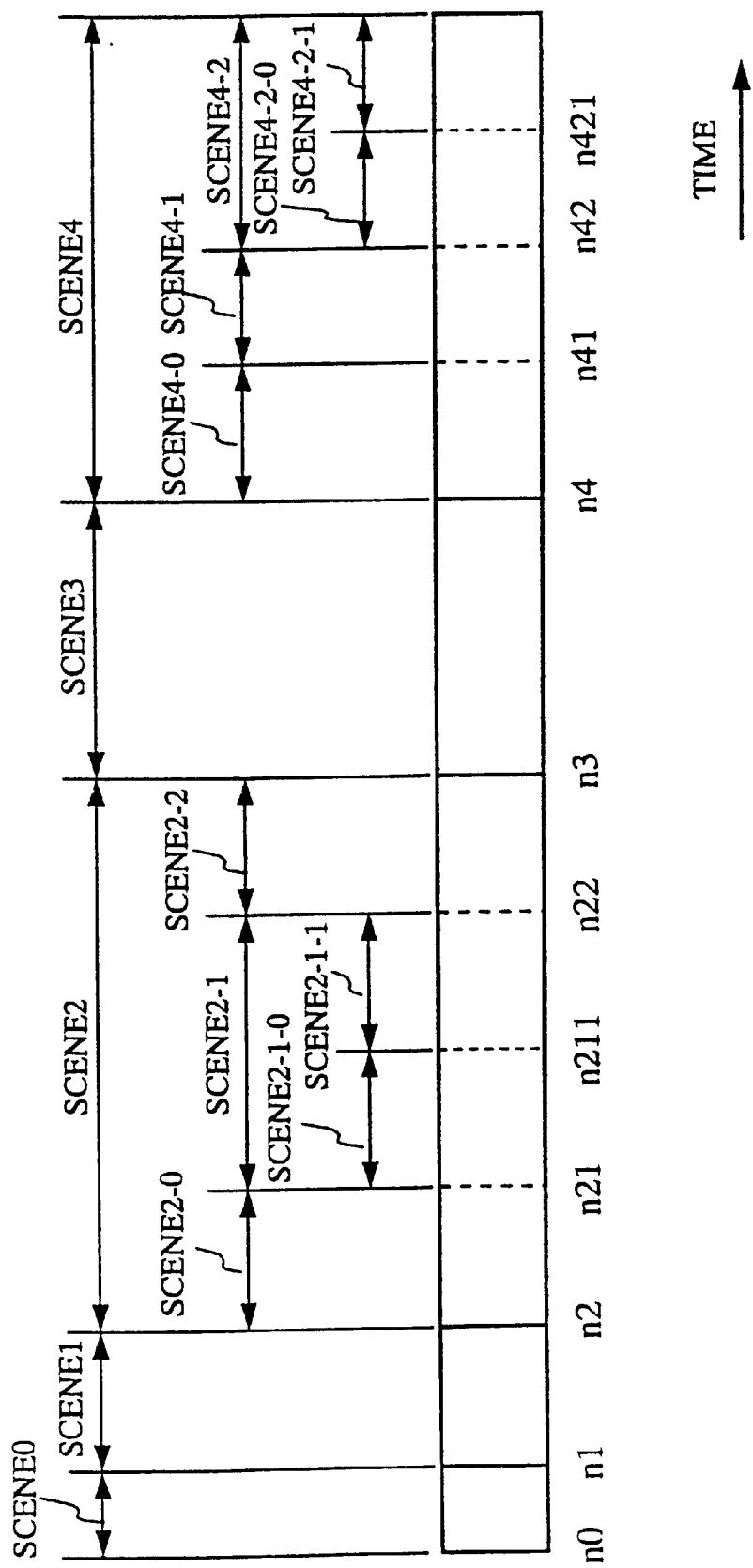
FIG. 26 is a diagram showing an example of a scene configuration and frame number of Embodiment 9.

FIG. 26 indicates the relations between the structure of the scenes and the priority set for the frames. The relations between the structure of the scenes and the priority set for the frames indicated in FIG. 26 corresponds to the contents of the priority table shown in FIG. 23. In case of this example, the moving picture is largely divided into four major scenes from scene 1 to scene 4, based on the meanings of the contents. Of them, scene 2 and scene 4 are divided into three medium scenes (scene 2-0 to scene 2-2, scene 4-0 to scene 4-2). Further, scene 2-1 and scene 4-2 are divided into two small scenes (scene 2-1-0, scene 2-1-1, scene 4-2-0, and scene 4-2-1). The leading frame of the major scene is set to priority 1, the leading frame of the medium scene but not the leading frame of the major scene is set to priority 2, and the leading frame of the small scene but not the leading frame of the medium scene is set to priority 3.

Setting priority this way enables frame selection according to the set priority. As a result, the leading frames n1, n2, n3, and n4 of the major scenes can be displayed at the high-speed forwarding, and the leading frames n21, n22, n41, and n42 of the medium scenes can be displayed at the mid-speed forwarding, and the leading frames n211, n421 of the small scenes can be displayed at the low-speed forwarding. Also it is possible that the leading frames n1, n2, n21, n22, n3, n4, n41, and n42 of the major scenes and medium scenes are displayed at the mid-speed forwarding, and the leading frames n1, n2, n21, n211, n22, n3, n4, n41, n42, n421 are displayed at the low-speed forwarding.

By selecting the leading frame of each scene, an example of setting high priority is shown in the previous example. As other examples, it is also possible that high priority can be set by selecting frames other than the leading frame, or high priority can be set by selecting not just one frame but two or more frames for each scene. In either method of setting priority, the display reflecting the priority set by the user can be realized at forwarding in an unchanged manner.

Now, the explanation is given about playback speed set unit 301, but prior to the explanation, the normal playback speed is explained.

Unlike still pictures, moving pictures are the data obtained as time passes by. Namely, moving pictures are collected in real time. The collected moving picture data holds the time information which indicates the time in addition to the moving picture information. The normal playback speed in the explanation hereinbelow refers to the playback in the time the same as the time passed during the collected moving pictures.

Playback speed set unit 301 sets the speed at which the moving pictures are played back. Examples of playback speed set screen displayed by playback speed set unit 301 are shown in FIG. 27 through FIG. 29.

Figure 27:
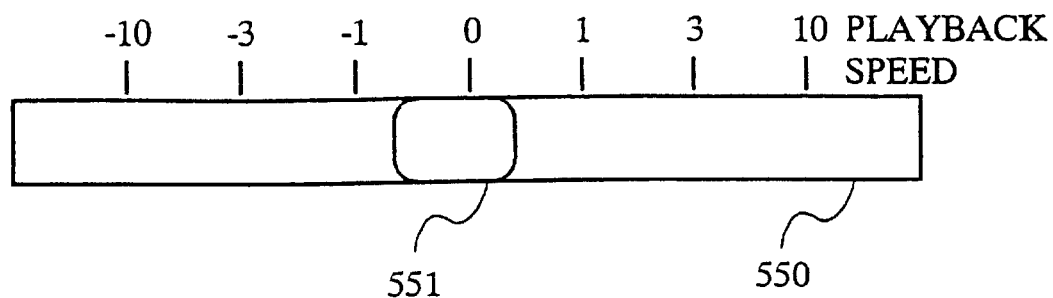
FIG. 27 is a diagram showing an example of screen display of a playback speed setting of Embodiment 9.
Figure 28:
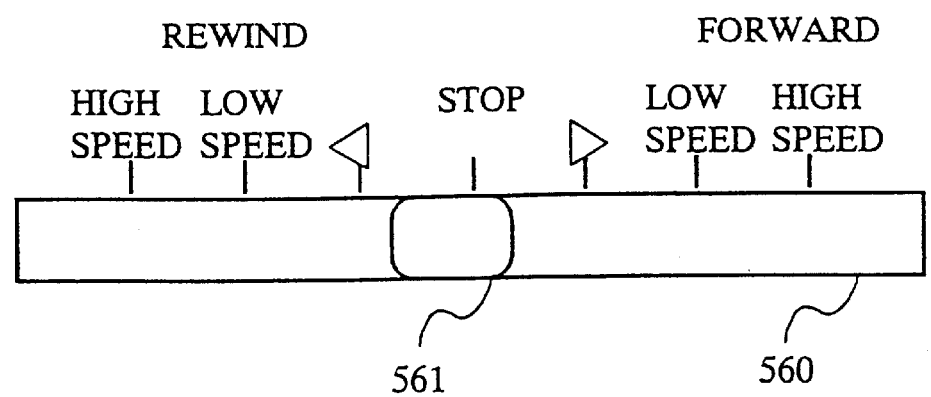
FIG. 28 is a diagram showing an example of screen display of the playback speed setting of Embodiment 9.

In the examples shown in FIG. 27 and FIG. 28, the playback speed can be changed by sliding handles 551, and 561 from left to right, respectively, with slid bars 550 and 560 displayed on the screen. When handles 551 and 561 are on the right side from the center, it means the playback in the forward direction, and when they are on the left side from the center, it means the playback in the reverse direction. When handles 551 and 561 are in the center, it means still, and when handles 551 and 561 are on the edge, it means the high-speed forwarding (on the right edge) or rewinding (on the left edge), respectively. The number on top of slide bar 550 in FIG. 27 indicates the magnification (the ratio for the playback time of the real time of the moving picture data) for the normal playback speed. For instance, 3 means the playback is performed at the speed three times faster than the normal speed. That is, the playback is performed in the time one third of the time passed in the moving pictures.

FIG. 28 shows an example of setting the playback speed in each stage, "High-Speed Forwarding", "Low-Speed Forwarding" and "Normal Playback" and so on.

Figure 29:
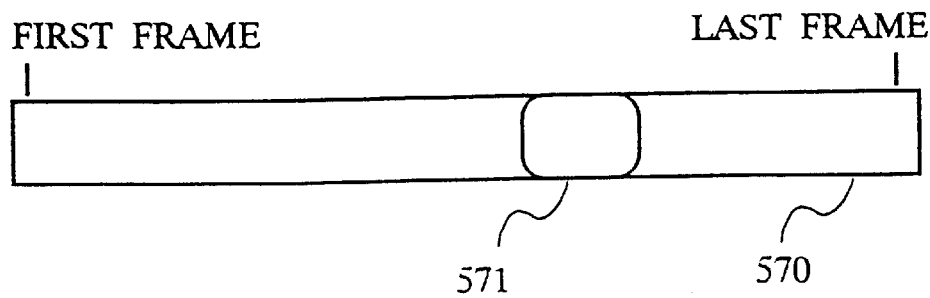
FIG. 29 is a diagram showing the screen display of playback speed setting of Embodiment 9.

FIG. 29 shows an example in which slide bar 570 is corresponding to the leading frame to the last frame of the moving picture. The position of the frame to be displayed is specified by sliding handle 571. And the playback speed is specified by the speed at which handle 571 is sled. Sliding handle 571 at high speed specifies the high-speed playback, and sliding handle 571 at low speed specifies the low-speed playback.

Frame selection unit 303 discards/selects frames of the moving picture. Frame obtainment unit 309 can obtain the image of the frame specified at the speed of 5 frames per second, in this embodiment. Let us assume that the playback speed is set with a magnifying speed of 10. And if a moving picture is composed of 30 frames per second, the playback with a magnifying speed of ten corresponds to the playback display of the moving pictures of 300 frames per second. Given the processing capacity of the previously described frame obtainment unit 309, however, frame selection unit 303 is to display by selecting 5 frames among 300 frames.

In this case, the simplest method of frame selection is to select frames at an equal interval. Namely, if the frame numbers of the 300 frames to be played back are m, m+1, . . . m+299, then, frames m, m+60, m+120, m+180, m+240 can be selected. When the frame is selected by frame selection unit 303 in this way, frame obtainment unit obtains the image of the selected frame, and moving picture display unit 307 displays the obtained frame image.

According to the above method of selecting frames in an equal interval, forwarding or rewinding at the set playback speed is made possible, but the method poses a concern that an important scene may be skipped and not displayed. For instance, a scene of Mt. Fuji is inserted between the frame number m+10 and the frame number m+50, and the user is searching for the scene of Mt. Fuji by forwarding with the magnifying speed of 10, not a single frame constituting the scenes of Mt. Fuji is going to be displayed in the above method. Therefore, the priority is set as shown in FIG. 23, based on the setting method of priority previously described. That is, scenes are defined based on the content of the moving pictures, and a high priority is set by selecting frames for each defined scene. In this way, it is guaranteed that at least one frame is selected for a short scene and diploid during forwarding. As a result, at the time of forwarding, the display based on the contents of the moving picture can be realized.

Figure 30:
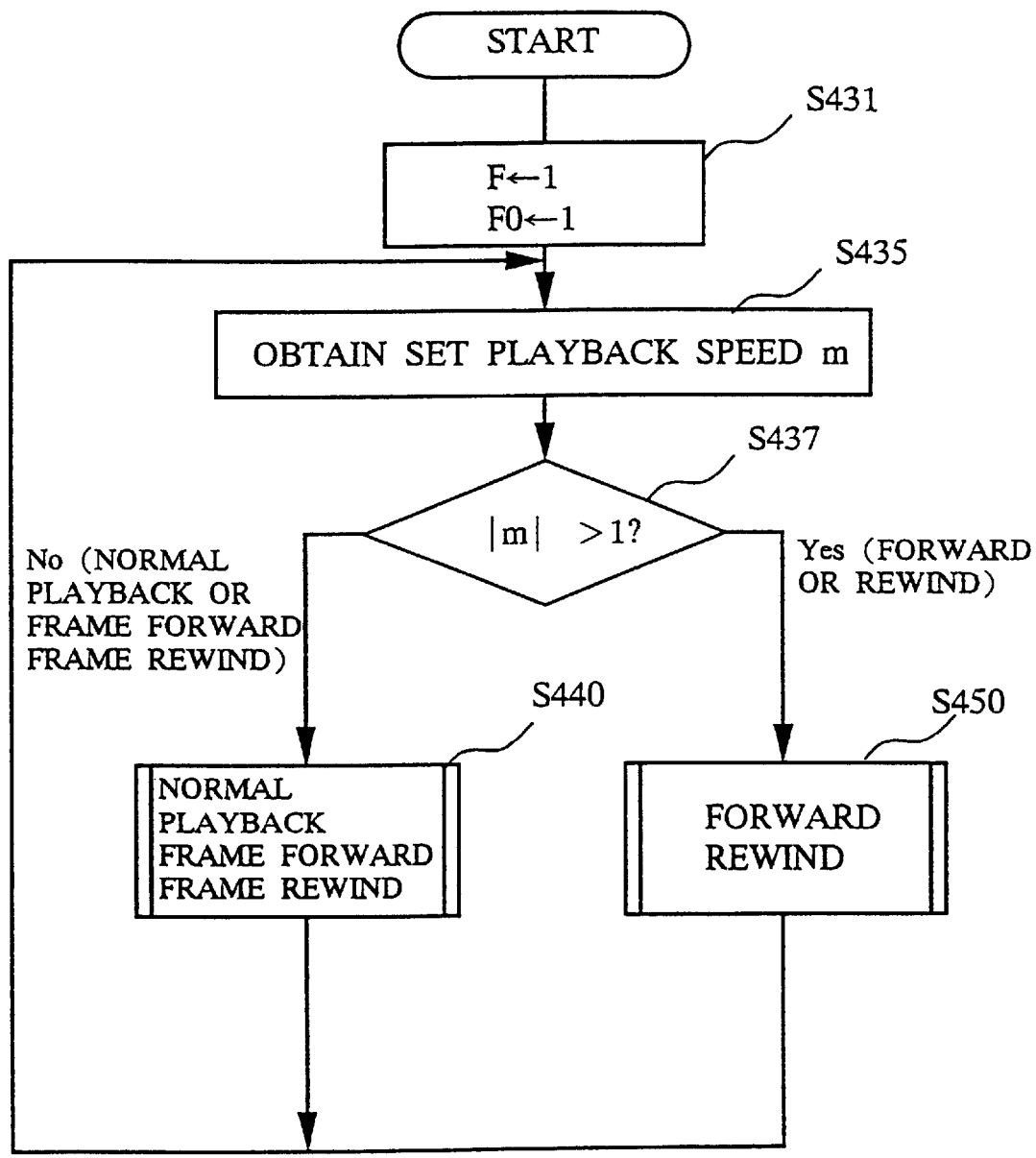
FIG. 30 is a diagram showing an operation flow of a moving picture display of Embodiment 9.
Figure 31:
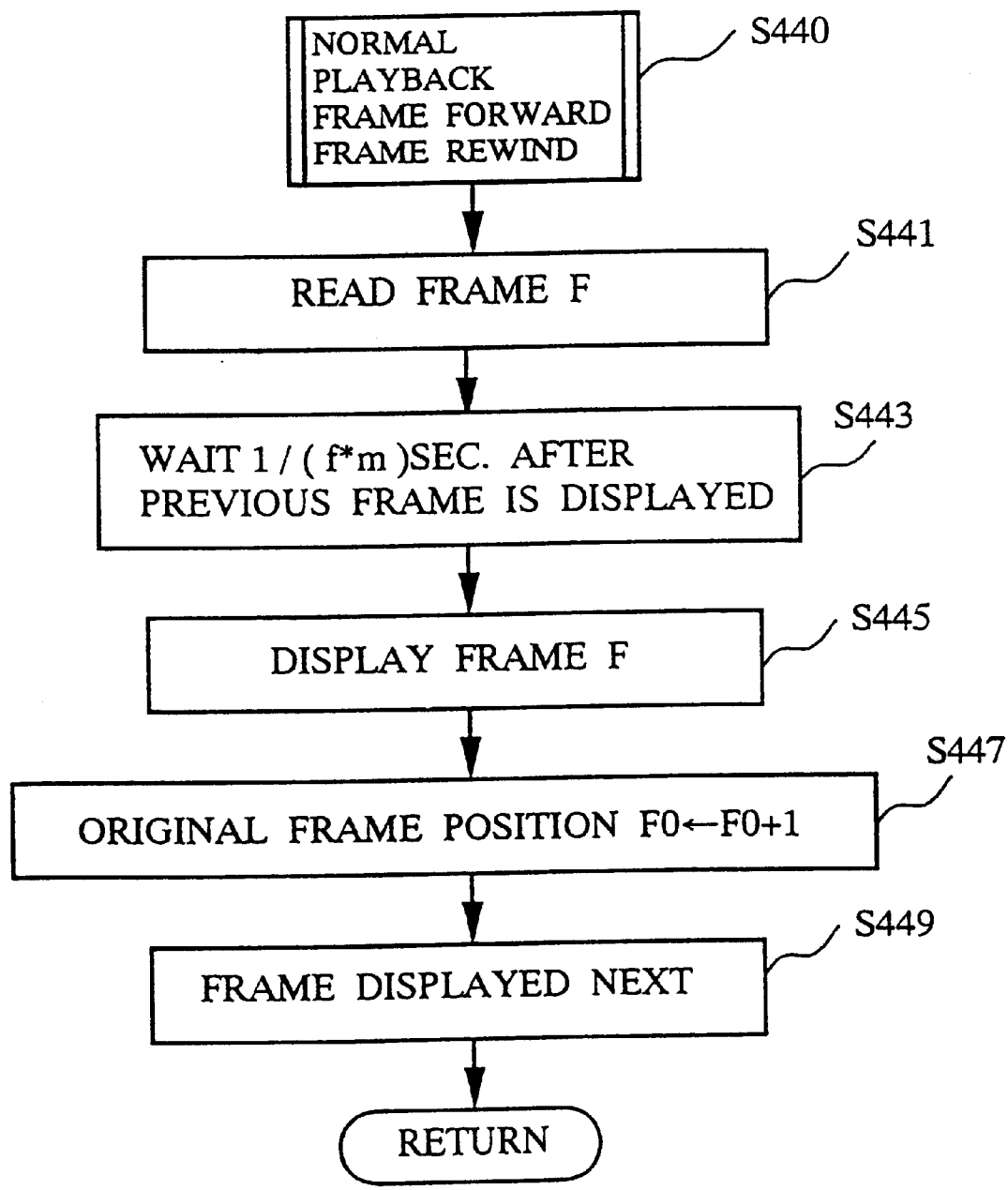
FIG. 31 is the diagram showing the operation flow of the moving picture display of Embodiment 9.
Figure 32:
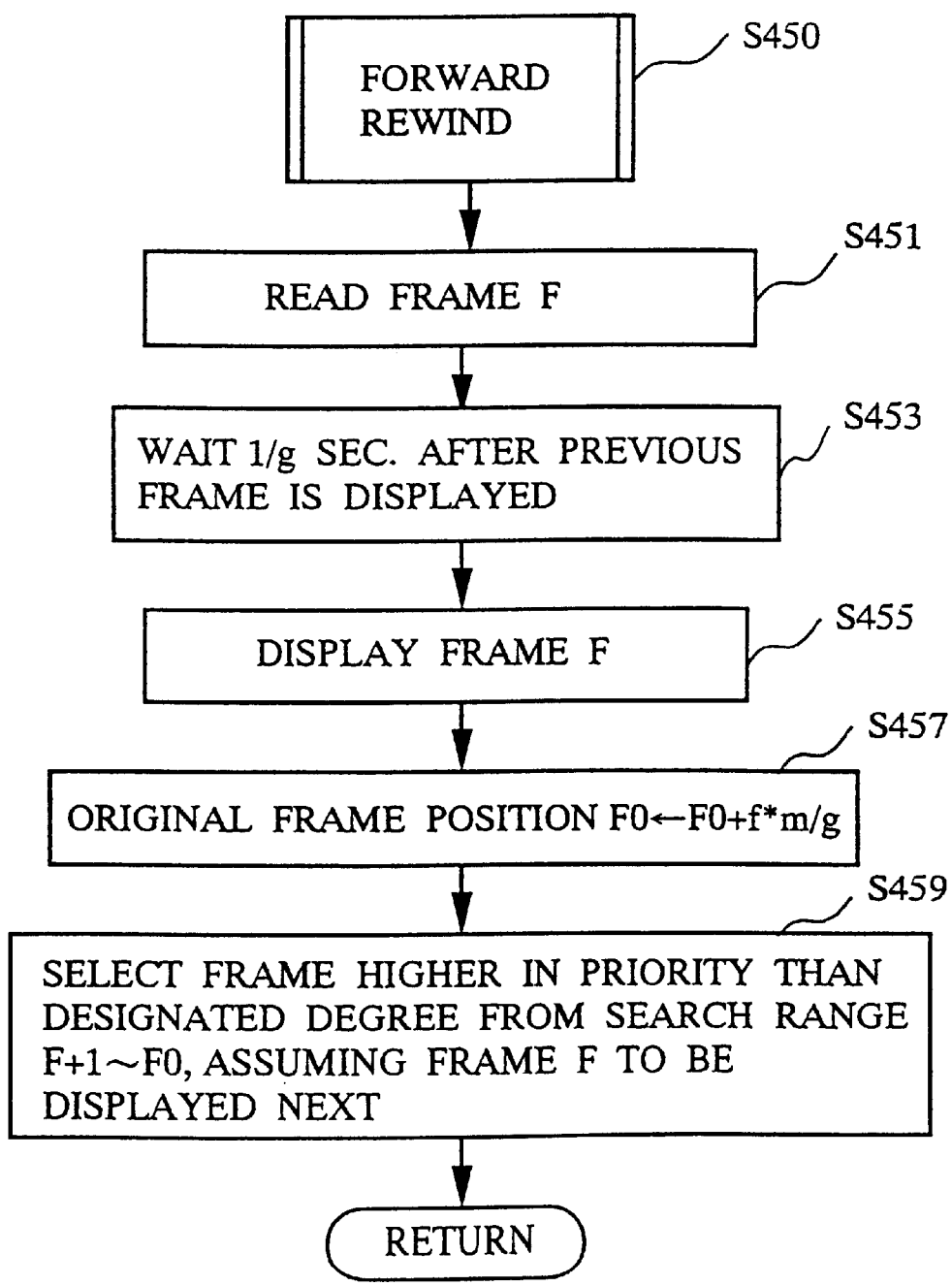
FIG. 32 is the diagram showing the operation flow of the moving picture display of Embodiment 9.

FIG. 30 to FIG. 32 show examples of operation flows of the moving picture playback apparatus of the above embodiment. Hereinafter, the explanation is given according to the flows.

The codes used for FIG. 30 to FIG. 32 are explained first. F indicates the current frame position, F0 is the original frame position, f is the number of frames per second, g is the number of frames displayed per second during forwarding Qr rewinding, and m indicates the set playback speed.

The explanation is given in accordance with FIG. 30. At S431, 1 is set for the current frame position F and for the original frame position F0. Then, at S435, the set playback speed m is obtained. The absolute value of the obtained playback speed m is determined whether it exceeds "1" (S437), and then either the normal playback, frame forward, frame rewind processing at S440 or the forward, rewind processing of S450 is performed.

With referring to FIG. 31, a case when the absolute value of the set playback speed m is below "1", namely, the normal playback, slow playback, frame forward, frame rewind (S440) is explained. For the case of forwarding or rewinding, which will be explained later, about 5 frames are suitable to enable the user to sufficiently confirm visually as the number of frames g to be displayed per second. On the other hand, about 15 to 30 frames are suitable as the number of frames to be displayed per second for the normal playback in order to realize the smooth playback. Generally, it is desirable to display all frames without omitting because the number of frames is set to 15 to 30 frames per second considering the smooth playback to be realized in the normal playback speed for the digitallized moving picture data. It is also desirable that the frames are all displayed without being omitted for the slow playback, frame forward, and frame rewind, naturally. When obtaining the images of the frames one by one by frame obtainment unit 309 in the explanation given later at S450, the number of frames g that can be obtained per second is assumed to be 5 frames, but for the case in which the moving picture data, etc., compressed in MPEG is the target, when the continuous frames are continuously read and played back, the number of frames that can be played back per second generally increases more than 5 frames. It is assumed that the playback at the speed of 30 frames per second is possible when the continuous frames are continuously read and played back.

When the number of frames per second of the target moving picture data is assumed to be f, and the set playback speed to be m, then the time for displaying 1 frame becomes 1/(f*m), therefore, frames can be obtained one after another at the time interval and displayed for the case of normal speed playback or slow playback.

The processing of S440 is explained in concrete according to FIG. 31.

At S441, frame obtainment unit 309 reads frame F, first. Then, at S443, after the previous frame is displayed, the time 1/(f*m) is waited until it is passed. At S445, moving picture display unit 307 displays frame F. After that, at S 449, the frame F to be displayed next is assumed to be F+1. For the case of frame forward or frame rewind, the processing waits until the next button is pressed, and the next frame of the previous frame can be obtained each time when the button is pressed and displayed.

When the absolute value of the playback speed m set by playback speed set unit 301 exceeds "1", that is, a case in which the forward or rewind is specified (S450) is explained next according to FIG. 32.

When the number of frames to be obtained per second by frame obtainment unit 309 is assumed to be g, in other words, when the number of frames to be displayed per second during forwarding or rewinding is assumed to be g, it means that frames can be switched at every 1/g second and displayed. Therefore, frame F is read (S451) by frame obtainment unit 309. Then, after the previous frame is displayed, the time 1/g is waited until it is passed (S453). Then, at S455, frame F is displayed by moving picture display unit. When the number of currently displayed frame is assumed to be F0, the number of frame to be next displayed becomes F0+f*m/g (S457). However, in order to avoid the high priority frames from being omitted as explained previously, the processing is done as below.

From frame number F0+1 to frame number F0+1*m/g is set as the search scope, and a frame with high priority within the search scope is selected, and the selected frame is set as the frame to be next displayed (S459). Because the frame that should be played back based on the playback speed is F0+f*m/g, this frame is newly assumed to be F0. When there are a plurality of frames with high priority within the search scope, a frame that can be searched earlier than others is selected, and when the next selection scope is assumed to be from F+1 to F0+f*m/g, then another frame with high priority is to be selected in the next search.

In this embodiment, the moving picture playback apparatus provided with frame obtainment unit 309 which obtains the image of the moving picture frames, priority obtainment unit 305 which obtains the priority set for the moving picture frames, playback speed set unit 301 which sets the moving picture playback speed, frame selection unit 303 which discards/selects frames of the moving picture based on the playback speed set by playback speed set unit 301 and the priority of the moving picture frames obtained by priority obtainment unit 305, and moving picture display unit 307 which obtains the image of the frame selected by frame selection unit 303 and obtains it from frame obtainment unit 309 and displays is explained.

Embodiment 10

The moving picture playback apparatus which can switch the frame of the moving picture to high speed and display by means of the typical image obtainment unit and the typical image storage unit is explained next.

Figure 33:
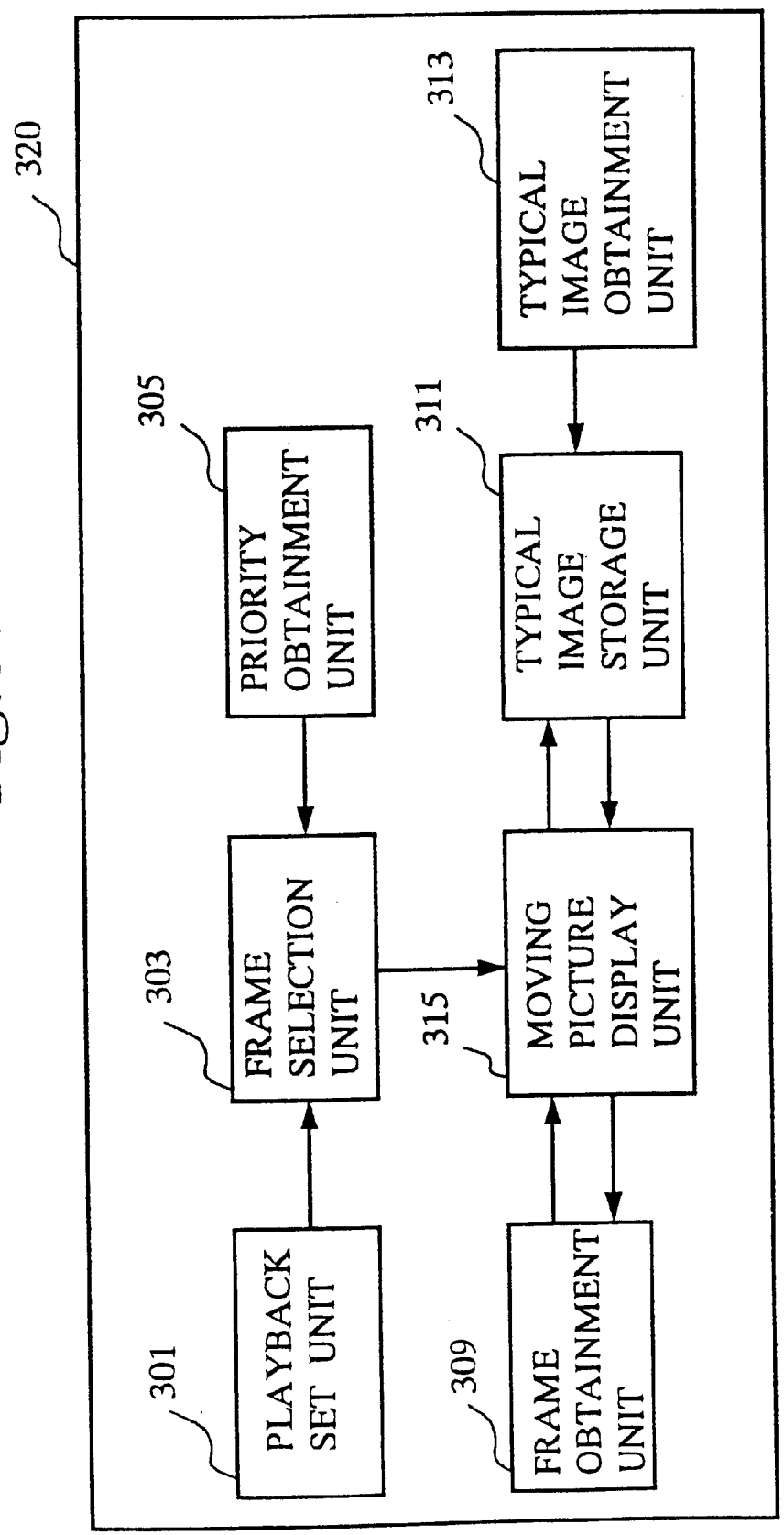
FIG. 33 shows a configuration of a moving picture playback apparatus of Embodiment 10.

FIG. 33 shows the configuration of the moving picture playback apparatus of Embodiment 10.

The moving picture playback apparatus of this embodiment is equipped with a frame obtainment unit 309 for obtaining the image of the frame of the moving picture, a typical image obtainment unit 313 for obtaining the image of the selected frame of the moving picture as a typical image, a typical image storage unit 311 for storing the typical image obtained by typical image obtainment unit 313, a playback speed set unit 301 for setting the moving picture playback speed, a frame selection unit 303 for selecting the frame of the moving picture based on the playback speed set by playback speed set unit 301, and a moving picture display unit 315 for reading the image of the selected frame by frame selection unit 303 and displaying. A computer 320 is also illustrated.

This embodiment is especially effective when the moving picture data stored in a server computer is read from a client computer connected via the network and playback. In that case, the previously mentioned computer 320 corresponds to the client computer, and typical image storage unit 311 corresponds to the memory of the client computer.

Although the previous Embodiment 9 is explained assuming that frame obtainment unit 309 can obtain the image of the specified frame at the speed of 5 frames per second, the transfer speed may decline when the moving picture data is transferred via the network. If the transfer speed is assumed to be about 2 frames per second, the number of frames to be displayed per second decreases from 5 to 2 with the configuration of the moving picture playback apparatus of Embodiment 9, which has a defect of degrading efficiency in searching scenes.

This embodiment aims at overcoming this defect. In order not to decrease the number of frames to be displayed per second in such a case, typical image storage unit 311 is provided for the main storage unit of a client computer capable of reading and displaying the image at high speed for storing the typical images.

The operation of each configuration element is explained below.

The operation for frame obtainment unit 309, playback speed set unit 301, frame selection unit 303 is basically the same as that of previous Embodiment 9.

Figure 34:
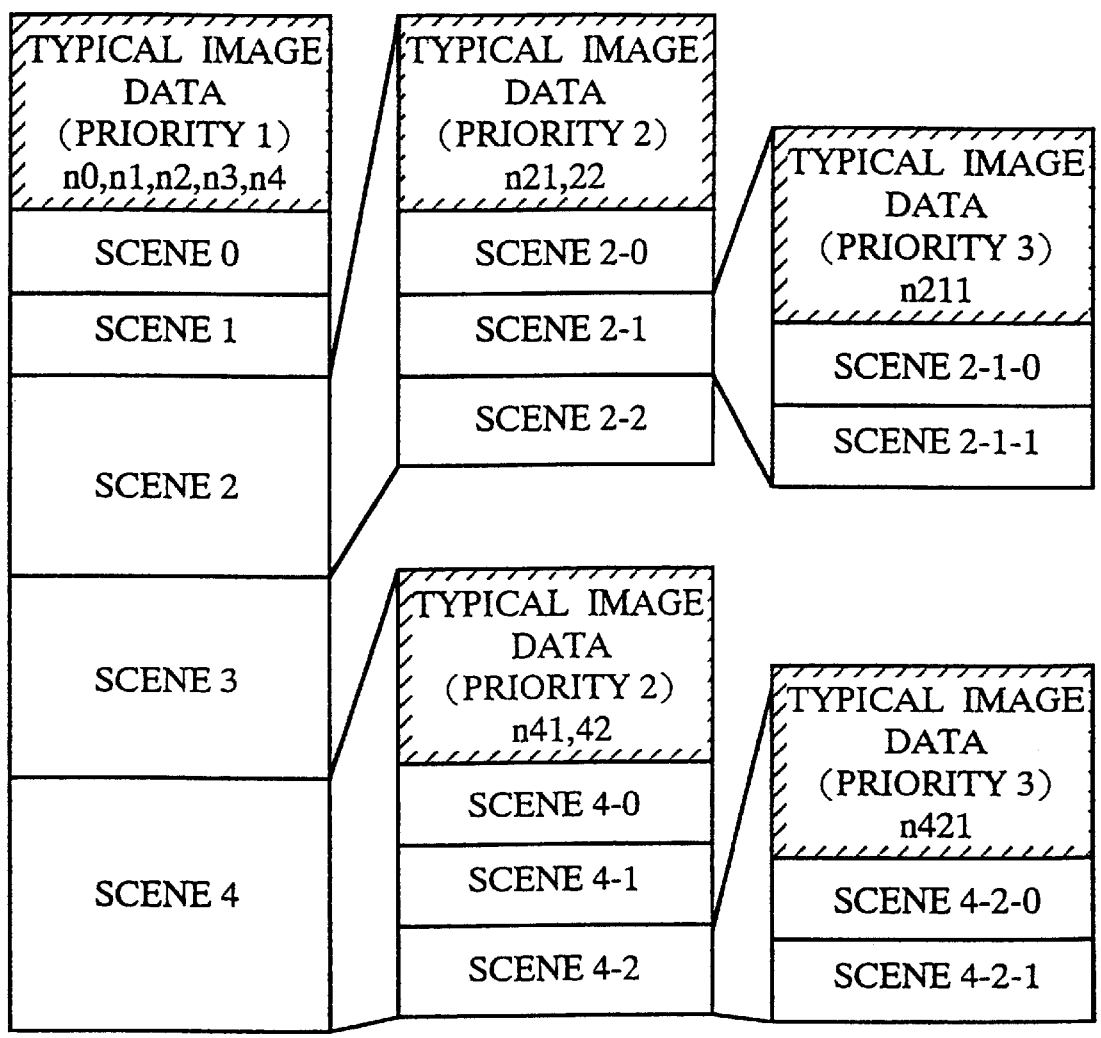
FIG. 34 is a diagram showing an example of typical moving picture data of Embodiment 10.

Typical image obtainment unit 313 obtains the image of the frame selected among the moving picture frames as the typical image. A selected frame means about a frame the user selects from the moving pictures so as to be stored as the typical image. A case of selecting a frame corresponding to the priority set to the frame is assumed in this embodiment. As a concrete method of obtaining a typical image, for instance, there is a method of obtaining the data by obtaining the frame selected among the moving picture data stored in the server computer, etc., and then expanding it. In such a case, although obtaining the typical image each time is time consuming and troublesome, only the frame number of the selected frame can be stored, therefore, the storage capacity can be smaller compared to the case of storing the typical image itself. It is also possible to store the typical image data defined separately from the moving picture data collectively as the moving picture data beforehand, and then read it out. As one example of the latter case, a format of storing the moving picture data and the typical image data collectively in one file is shown in FIG. 34. In this example, the leading frame of each scene defined in the moving picture is defined as the typical image. The leading frame of each scene is the frame with high priority indicated in the previous Embodiment 9. The typical image is defined for the major scene, medium scene, and small scene, respectively. The meaning of the major scene, medium scene, and the small scene is the same as the previous embodiment. The typical images n0, n1, n2, n3, and n4 of the major scene are positioned to the beginning of the entire data, and the typical images n21, n22, n41, and n42 of the medium scene are positioned to the beginning of the data of the major scenes (scene 2, scene 4) to which each medium scene belongs, and the typical images of the small scene n211, n421 are positioned to the beginning of the medium scenes (scene 2-1, scene 4-2) to which each small scene belongs.

The case of using the format files shown in FIG. 34 is explained below.

Typical image obtainment unit 313 selects the frame of the necessary typical image in accordance with the scene to be played back, obtains the selected typical image, and stores it in typical image storage unit 311. For instance, when scene 2-1-0 is tried to be played back, n211 which is the typical image of the small scene, n21 and n22, which are the typical images of the medium scene, and n0, n1, n2, n3, and n4, which are the typical images of the major scene are obtained and stored in typical image storage unit 311. All of these typical image data are stored before the moving picture data of scene 2-1-0 in the format file indicated in FIG. 34. Thus, typical image obtaining unit 313 can obtain the typical image by reading the file in the forward direction and store it in typical image storage unit 311. As a result, by the time when the moving picture data of the desired scene has been reached, the necessary typical image for the scene is obtained in typical image storage unit 311. When typical image storage unit 311 is incorporated in the internal memory of the client computer, in this way, there is a merit of reading the typical image faster than reading the typical image each time from the moving picture data stored in the external memory, for instance, the hard disk or the hard disk of the server computer, and therefore, efficient sense display and search is realized.

In a situation that the necessary typical image is obtained according to one of the scenes so far described, a case of trying to play back other scenes is explained next.

Let us assume now that the scene to be played back is changed by the operator, from scene 2-1-0 to scene 4-0. Typical images n211, n21, and n22 are no longer necessary for scene 4. Therefore, typical image obtainment unit 313 deletes typical images n211, n21, and n22, and obtains typical images n41 and n42 corresponding to scene 4 newly and makes typical image storage unit 31 add and store them.

In this way, for the scenes close to the currently displayed scene, even the frames with low priority are stored as the typical images, and for the scenes far from the currently displayed scene, only the frames with high priority are stored as the typical images. By changing the typical images to be stored according to the position of the frame currently displayed, the effective scene display and search are enabled by efficiently using typical image storage unit 311 which has a limited storage capacity.

Figure 35:
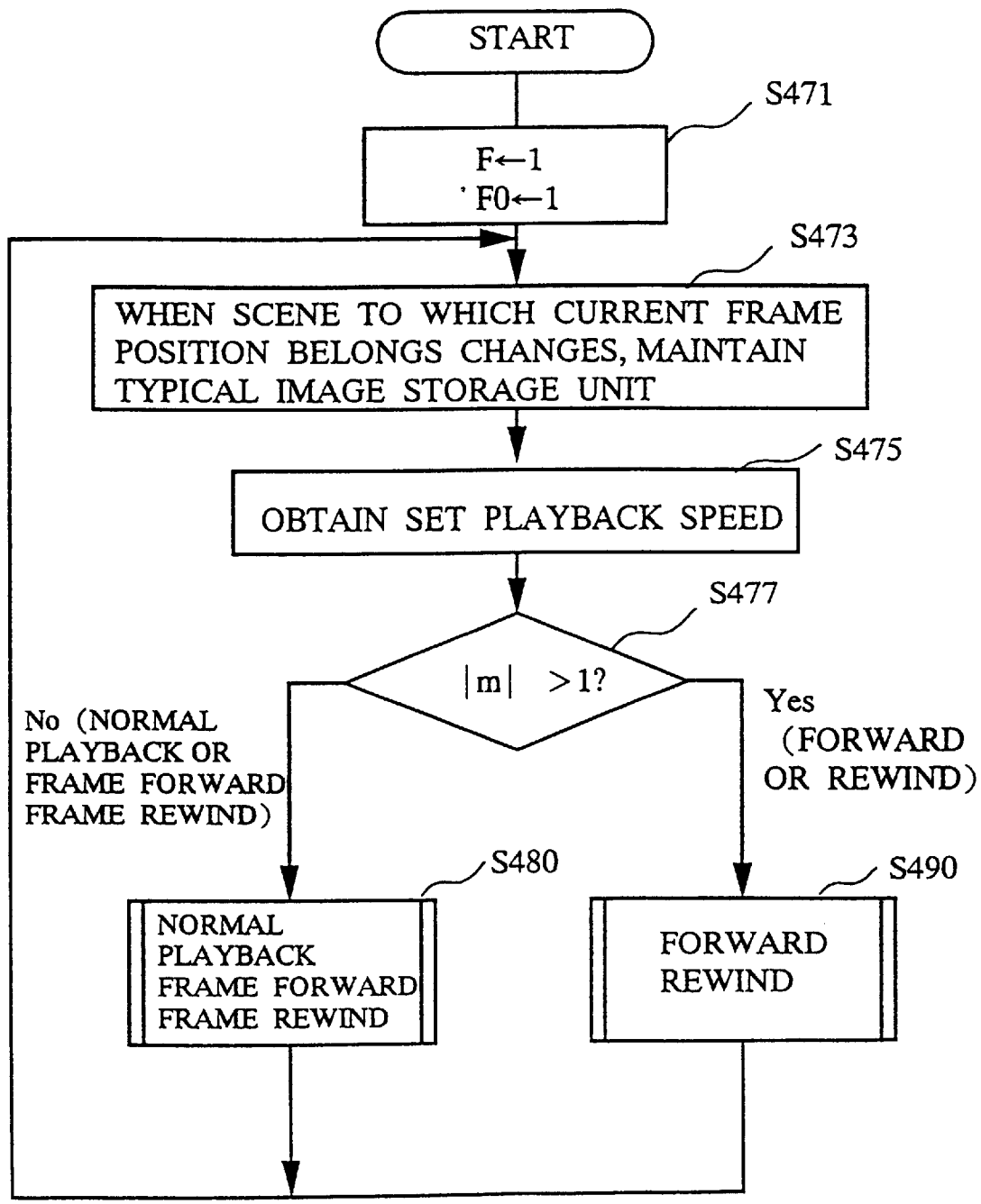
FIG. 35 is a diagram showing an operation flow of Embodiment 10.
Figure 36:
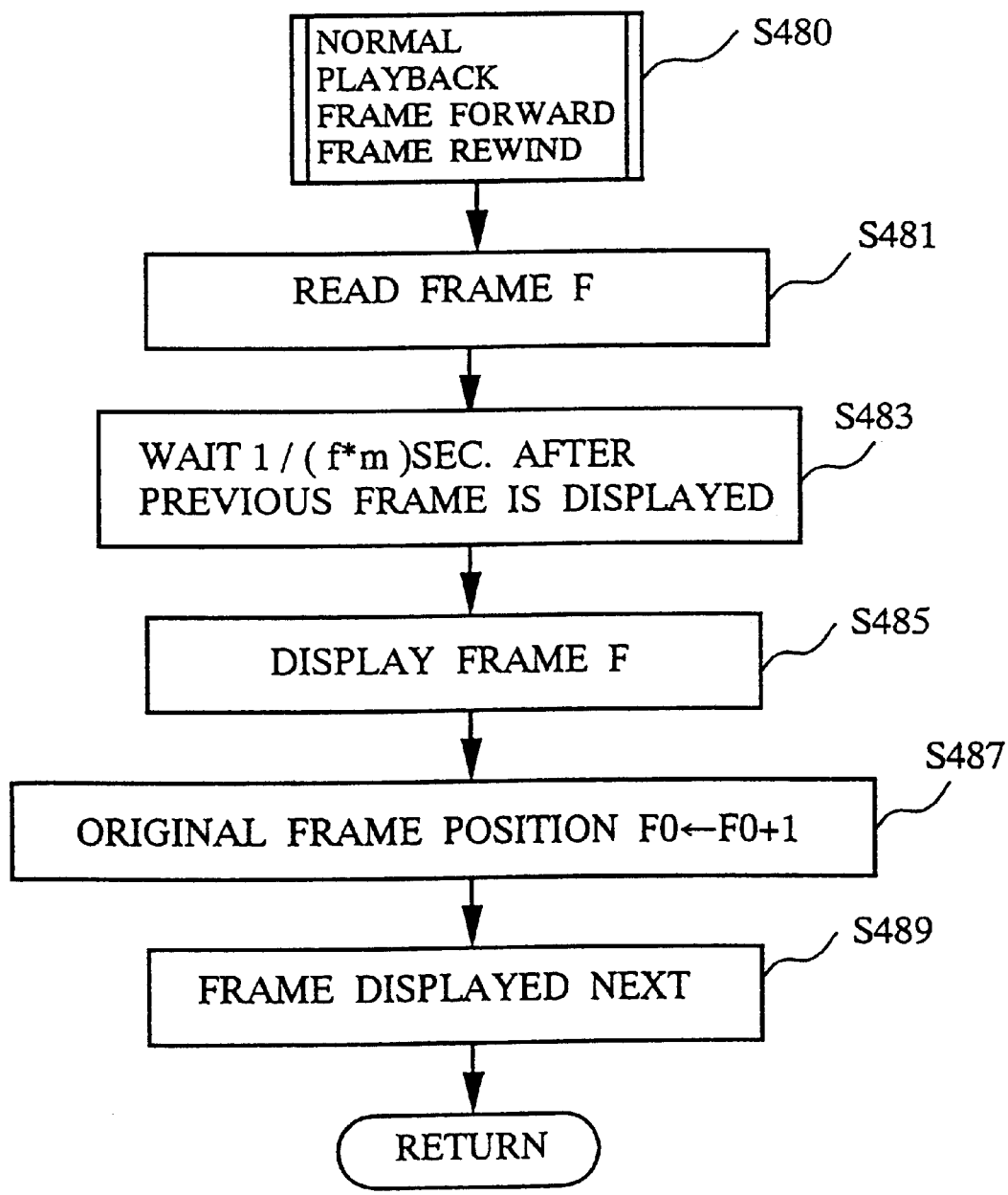
FIG. 36 is the diagram showing the operation flow of Embodiment 10.
Figure 37:
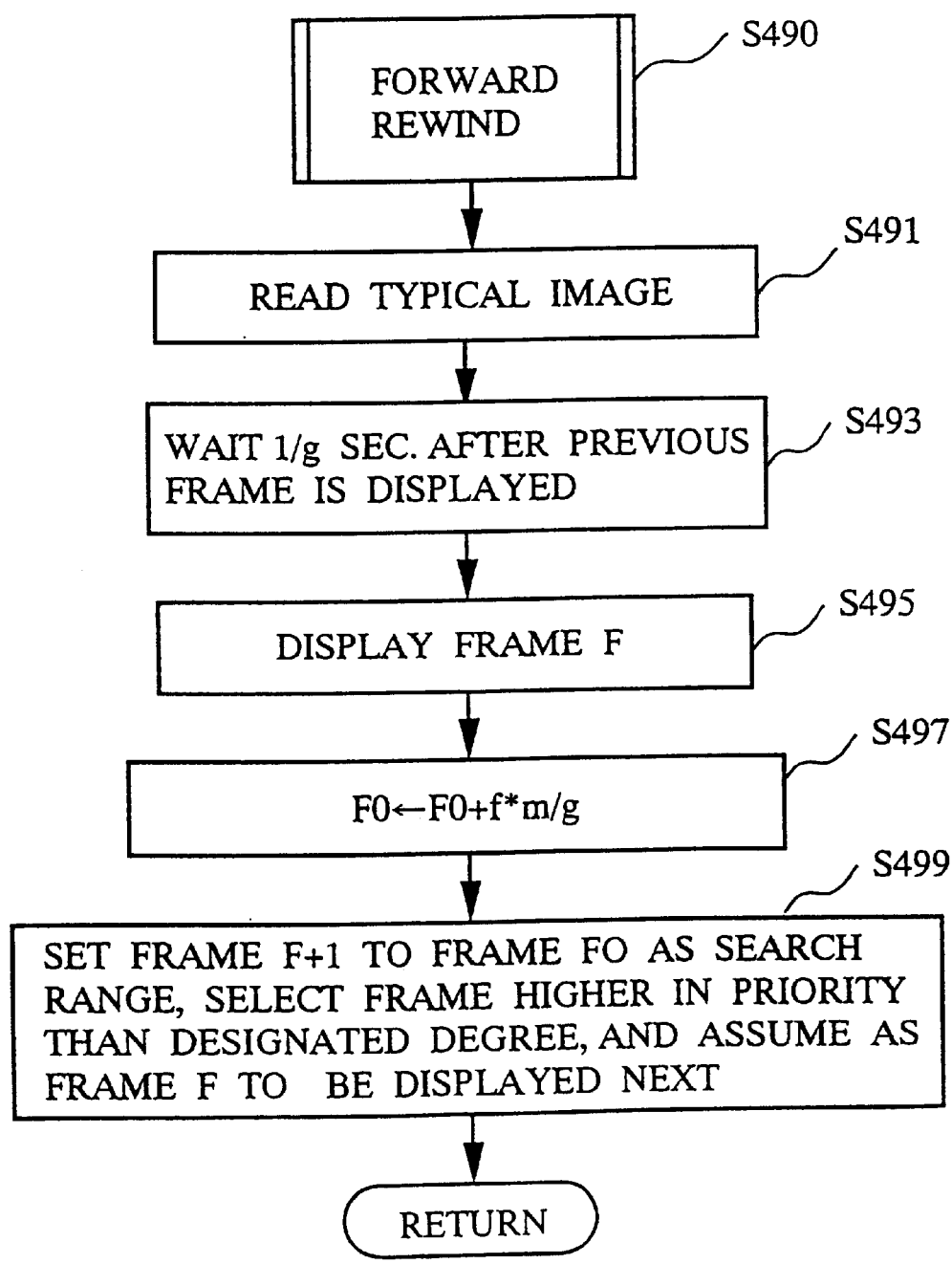
FIG. 37 is the diagram showing the operation flow of Embodiment 10.
Figure 38:
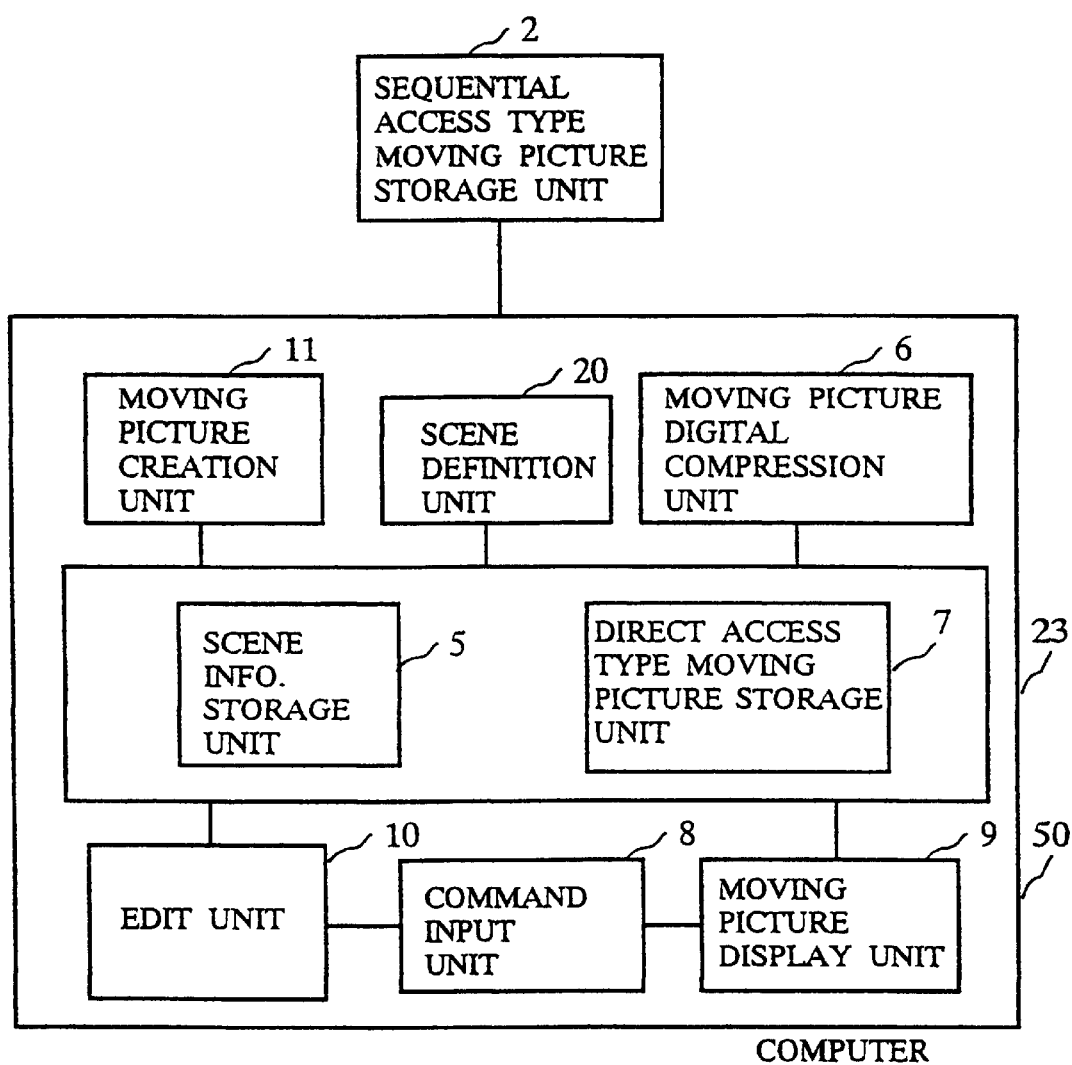
FIG. 38 shows a configuration of a conventional moving picture playback apparatus.
Figure 39:
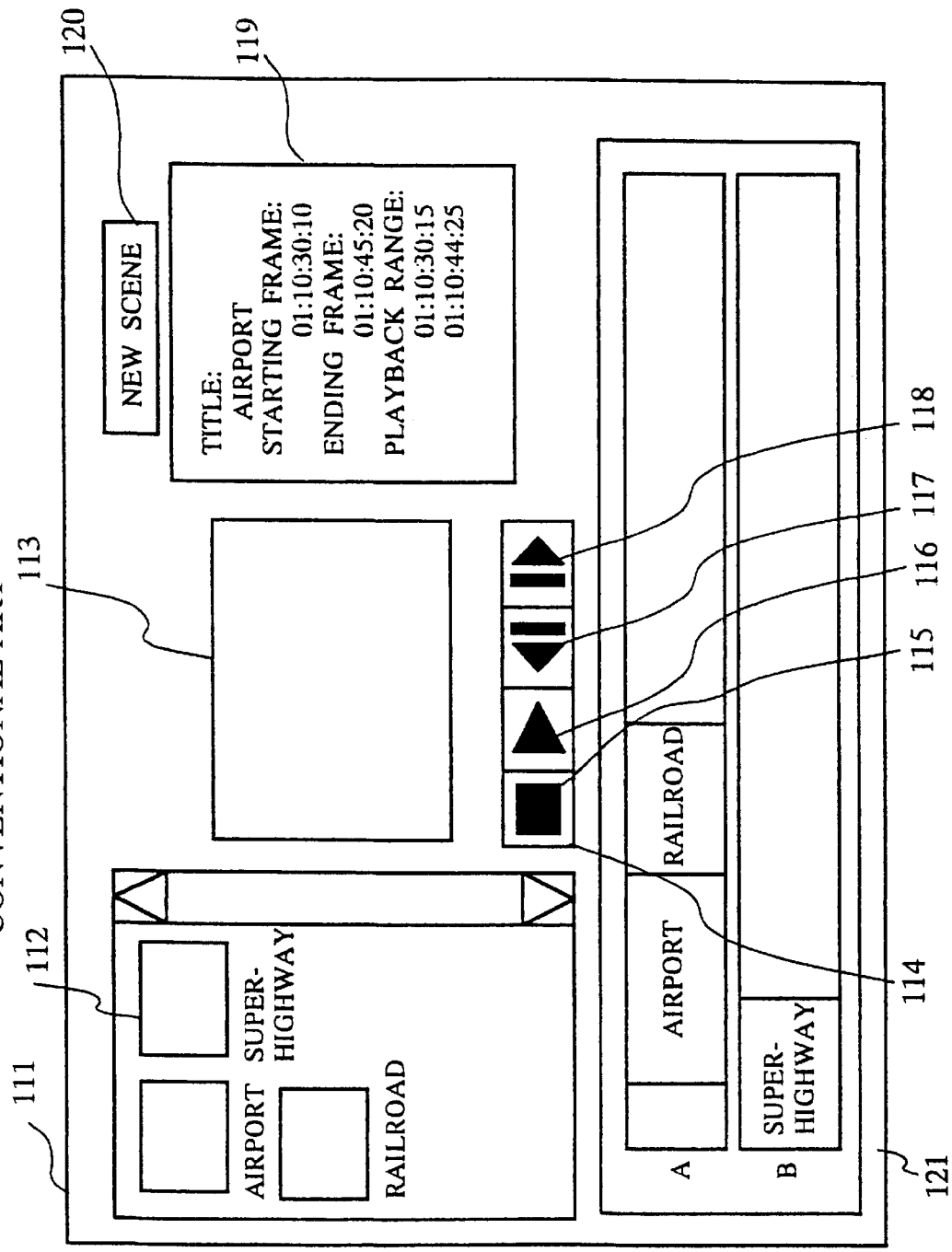
FIG. 39 explains a user interface of the conventional moving picture playback apparatus.

The operation flows of the moving picture playback apparatus of this embodiment are shown in FIG. 35 to FIG. 37. The explanation is given according to the flow hereinbelow.

Because the signs to be used for FIG. 35 to FIG. 37 are the same as those used for FIG. 30 to FIG. 32, their explanation is omitted.

Firstly, the explanation is given with referring to FIG. 35. At S471, "1" is set for the current frame position F and the original frame position F0. Then, at S473, when the scene to which the current frame position belongs has changed, the predetermined typical image corresponding to the scene is obtained by the typical image obtainment unit and stored in the typical image storage unit. Then, at S475, the set playback speed m is obtained. Then, it is determined whether the absolute value of the set playback speed exceeds "1" (S477), and based on this, either the normal playback, frame forward, frame rewind processing of S480 or the forward or rewind processing of S490 is performed.

Using FIG. 36, a case of when the absolute value of the set playback speed m is below "1", namely, a case of the normal playback, slow playback, frame forward, frame rewind, and so on (S480) is explained.

First, at S481, frame obtainment unit 309 reads the frame F. Then, at S483, after the previous frame is displayed, the time 1/(f*m) is waited until it is passed. Then, at S485, the frame F is displayed by moving picture display unit 315. Next, at S 487, the original frame position F is assumed to be F0+1. Then, at S489, the frame F to be displayed next is assumed to be F+1. For the frame forward or frame rewind, the processing waits until the button is pressed, and the next frame or the previous frame can be obtained and displayed every time the button is pressed.

Then, a case in which the absolute value of the playback speed m set by playback speed set unit 301 exceeds "1", e.g., when the forwarding or rewinding is specified (S490) is explained according to FIG. 37.

When the number of frames obtained per second by frame obtainment unit 309 is assumed to g, in other words, when the number of frames that can be displayed per second during forwarding or rewinding is assumed to be g, then frames may be switched and displayed by every 1/g second. Therefore, typical images are read from the typical image storage unit (S491). Then, after the previous frame is displayed, the time 1/g is waited until it is passed (S493). Then, at S495, the typical image read by the moving picture display unit is displayed as the frame F. Then, because after 1/g second, by which the next frame has to be displayed, the processing must be proceeded by fm/g frame. Therefore, if the currently displayed frame number is F0, the frame number to be next displayed becomes F0+f*m/g (S497). From the frame number F+1 through frame number F0 are set as the search scope, and a frame with high priority within the search scope is selected, and the selected frame is set as the frame F to be next displayed (S499).

Moving picture display unit 315 changes the reading destination of the moving picture data based on the set playback speed. When the set playback speed exceeds the normal playback speed, e.g., when the forwarding or rewinding is specified, only the frame for which the high priority is set may be displayed. Because the frames with high priority are stored in typical image storage unit 311, data can be read from typical image storage unit 311 at high speed and displayed.

When the set playback speed is below the normal playback speed, e.g., when the normal playback, frame forward, frame rewind, etc., is specified, there is no need to switch frames at high speed, rather, frames have to be displayed accurately including the frames with low priority. Therefore, the image data is read by each frame from frame obtainment unit 309 and displayed.

Generally, when a specific frame is searched among the moving picture frames. it is efficient that the positioning is first made close to the target frame by the high speed forwarding or rewinding, and then the positioning operation is performed to the specific frame by the low speed frame forwarding or frame rewinding. Such operation is normally carried out irrespective of the digital or analog moving picture data In this embodiment, when the high speed forward or rewinding is performed, the image is displayed at high speed by reading the data stored in typical image storage unit 311, and for the low speed frame forwarding or frame rewinding, the image is displayed accurately in the frame unit by reading the data directly from the moving picture storage unit by the frame obtainment unit. Thus, a remote client computer can access the moving picture data stored in the server computer, and a search of the frame at an arbitrary speed forwarding or rewinding is realized.

In this embodiment, the moving picture playback apparatus having frame obtainment unit 309 for obtaining the frame images in the moving pictures, priority obtainment unit 305 for obtaining the priority set for the moving picture frames, typical image obtainment unit 313 for obtaining the image of the frame selected from the moving pictures as the typical image, typical image storage unit 311 for storing the typical image obtained by the previously mentioned typical image obtainment unit 313, playback speed set unit 301 for setting the moving picture playback speed, the frame selection unit for discarding/selecting the frame in the moving picture based on the playback speed set by playback speed set unit 301 and the priority of the frame in the moving picture obtained by priority obtainment unit 305, and moving picture display unit 315 for reading the image of the frame selected by frame selection unit 303 from typical image storage unit 311 and displaying it is explained.

Typical image storage unit 311 of the moving picture playback apparatus of this embodiment changes the frame to be stored as the typical image according to the position of the frame currently displayed.

Industrial Applicability

This invention has effects as hereinbelow described due to the configuration thus far set forth.

According to the first to third invention, because the segment of the moving picture is defined as a scene with the frame corresponding to the events being shot as the end, the definition operation for the scene is not required, thereby a scene (moving picture) to be displayed can be played back in a short time period.

According to the fourth invention, because the new scenes are played back and edited by reading the scenes stored in the moving picture storage unit based on the scene information stored in the scene information storage unit, the moving pictures can be played back and edited quickly with an easy operation.

According to the fifth invention, because the typical frame of the scene defined with the segment of the moving picture as the scene is read from the typical frame storage unit and displayed, there is no need of storing all moving pictures which are the target of editing by digitally compressing in the moving picture storage unit, the contents of the moving pictures can be confirmed in a short time period.

According to the sixth invention, if the frame to be displayed is the typical frame, the typical frame can be displayed, and if the frame to be displayed is not the typical frame, then the closest typical frame is read from the previous frames from the frame storage unit and displayed, the contents of the scene can be confirmed in the short time period.

According to the seventh invention, if the frame to be displayed is not the typical frame during stop, frame forward, or frame rewind, then the frame to be displayed is read from the moving picture storage unit and displayed thus the contents of the scene can be confirmed in the short time period.

According to the eighth invention, if the frame to be displayed is the typical frame during stop, frame forward, or frame rewind, then the frame to be displayed is read from the typical frame storage unit and displayed, thus the contents of the scene can be confirmed in the short time period.

According to the ninth invention, because the typical frame determination unit selects a frame corresponding to the event detected by the event detection unit as the typical frame for the scene including that frame, the scene definition and the typical frame reading can be completed at the same time as the shooting, thus the moving pictures can be played back instantaneously and the contents can be confirmed.

According to the tenth invention, new scenes can be played back and edited by reading the scenes stored in the moving picture storage unit based on the typical frame stored in the typical frame storage unit, the moving pictures can be played back and edited quickly with an easy operation.

According to the eleventh through thirteenth invention, because the information of the event detected by the event detection unit and the frame numbers obtained by the frame number obtainment unit are stored in correlation, the index can be quickly displayed after the shooting ends, and therefore, the user can select the desired place of the moving picture and confirm the contents quickly.

According to the fourteenth and fifteenth invention, because the explanation sentence the user added to the event is stored in the event information storage unit as the event information, the user can select the desired place of the moving picture with the explanation sentence as the clue, as the explanation sentence is displayed as the index.

According to the sixteenth and seventeenth invention, because the event detection unit detects the approach, entry, or coming out of the preset shooting subject or shooting area, the places in the moving picture corresponding to the preset target or area as the index item, the user can select the desired place in the moving picture with this as the clue, and can confirm the contents quickly.

According to the eighteenth and nineteenth invention, because the image shooting device control unit performs the control of the shooting devise corresponding to the event detected by the event detection unit, there is no need for the user to perform the control of the shooting devise manually during shooting.

According to the twentieth invention, because the moving picture playback instruction unit instructs to playback the frame by indicating the frame number corresponding to the selected index item, the user can playback the place in the moving picture corresponding to the item by selecting the arbitrary item of the index, the contents can be quickly confirmed.

According to the twenty-first invention, because the information of the event detected by the event detection unit is expressed by the image or sound, and then stored by compositing with the moving picture shot by the shooting device, the event information can be overposed on the screen of the played back moving picture, and the user can find the desired place in the moving picture with the displayed event information as the clue, and the contents can be quickly confirmed.

According to the twenty-second invention, because the frame is selected and displayed based on the priority set by the priority set unit and the playback speed based on the playback speed set unit, forwarding or rewinding is enabled at an arbitrary speed without omitting the display of the important frame in the moving picture, and the contents of the moving picture can be quickly confirmed.

According to the twenty-third through twenty-fifth invention, because typical image obtainment unit 313 obtains the typical image and stores in the typical image storage unit, and frame obtainment unit 309 reads the typical image from the typical image storage unit and obtains the frames in the moving picture selected as the typical image can be switched and displayed at high speed, the contents of the moving picture can be quickly confirmed.

What is claimed is:

1. A moving picture playback apparatus, comprising:
   a moving picture storage unit for storing a plurality of moving picture;
   a scene definition unit for defining a segment in the moving picture stored in the moving picture storage unit as a scene;
   a scene information storage unit for storing scene information of the scene defined by the scene definition unit;
   a typical frame storage unit for storing scene information of the scene defined by the scene definition unit;
   a typical frame storage unit for storing a typical frame which represents the scene defined by the scene definition unit;
   a typical frame determination unit for selecting the typical frame, which represents the scene, in the scene defined by the scene definition unit, reading the selected typical frame from the moving picture storage unit, and storing in the typical frame storage unit;
   a command input unit for inputting an instruction from a user; and
   a moving picture display unit for displaying the typical frame stored in the typical frame storage unit based on the instruction input by the command input unit;

wherein the moving picture display unit displays the typical frame from the typical frame storage unit if the frame to be displayed is the typical frame, and displays the closest typical frame before the typical frame to be displayed from the typical frame storage unit if the frame is to be displayed is not the typical frame.

2. The moving picture playback apparatus of claim 1, wherein the moving picture display unit displays the frame to be displayed from the moving picture storage unit if the frame to be displayed is not the typical frame when the instruction input from the command input unit is one of a stop, frame forward, and frame rewind.

3. The moving picture playback apparatus of claim 1, wherein the moving picture display unit displays the typical frame from the typical frame storage unit if the frame to be displayed is the typical frame when the instruction input from the command input unit is one of the stop, frame forward, and frame rewind.

* * * * *